US010477157B1

(12) United States Patent
Shahdi et al.

(10) Patent No.: US 10,477,157 B1
(45) Date of Patent: Nov. 12, 2019

(54) APPARATUSES, METHODS AND SYSTEMS FOR A SENSOR ARRAY ADAPTED FOR VISION COMPUTING

(71) Applicant: Meta View, Inc., San Mateo, CA (US)

(72) Inventors: Ali Shahdi, Belmont, CA (US); Agis Mesolongitis, San Francisco, CA (US); Alan Beltran, Woodside, CA (US)

(73) Assignee: Meta View, Inc., San Mateo, CA (US)

( * ) Notice: Subject to any disclaimer, the term of this patent is extended or adjusted under 35 U.S.C. 154(b) by 49 days.

(21) Appl. No.: 15/448,572

(22) Filed: Mar. 2, 2017

Related U.S. Application Data

(60) Provisional application No. 62/302,794, filed on Mar. 2, 2016.

(51) Int. Cl.
| | |
|---|---|
| *H04N 5/232* | (2006.01) |
| *H04N 7/18* | (2006.01) |
| *H04N 9/04* | (2006.01) |
| *G06T 19/00* | (2011.01) |
| *G02B 27/01* | (2006.01) |
| *G06F 3/01* | (2006.01) |
| *G01S 17/08* | (2006.01) |
| *G01K 13/00* | (2006.01) |

(52) U.S. Cl.
CPC ............ *H04N 7/181* (2013.01); *G01S 17/08* (2013.01); *G02B 27/0172* (2013.01); *G02B 27/0176* (2013.01); *G06F 3/012* (2013.01); *G06T 19/006* (2013.01); *H04N 5/23238* (2013.01); *H04N 9/045* (2013.01); *G01K 13/00* (2013.01); *G02B 2027/0138* (2013.01); *G02B 2027/0141* (2013.01)

(58) Field of Classification Search
CPC .... G02B 2027/0138; G02B 2027/0141; G02B 27/0172; G02B 27/0176; G06F 3/012; G01S 17/08; G06T 19/006; G01K 13/00; H04N 9/045; H04N 7/181; H04N 5/23238

See application file for complete search history.

(56) References Cited

U.S. PATENT DOCUMENTS

| | | | | |
|---|---|---|---|---|
| 6,771,294 | B1 * | 8/2004 | Pulli ..................... | G06F 3/011 |
| | | | | 345/173 |
| 9,092,600 | B2 * | 7/2015 | Scavezze ............... | G06F 21/31 |
| 9,866,815 | B2 * | 1/2018 | Vrcelj ..................... | G06K 9/34 |
| 9,908,048 | B2 * | 3/2018 | Osman .................. | A63F 13/213 |
| 9,934,611 | B2 * | 4/2018 | Schmalstieg .......... | G06T 17/00 |
| 10,019,057 | B2 * | 7/2018 | Osman ................. | G02B 27/0172 |
| 2003/0133008 | A1 * | 7/2003 | Stephenson .......... | H04N 5/2251 |
| | | | | 348/47 |
| 2005/0203380 | A1 * | 9/2005 | Sauer ..................... | G02B 7/002 |
| | | | | 600/417 |
| 2012/0013988 | A1 * | 1/2012 | Hutchin ............. | G02B 27/0172 |
| | | | | 359/631 |

(Continued)

*Primary Examiner* — Anner N Holder
(74) *Attorney, Agent, or Firm* — Andrew Bodendorf

(57) ABSTRACT

Aspects of the disclosed apparatuses, methods and systems provide a sensor array including multiple sensors configured and arranged to enable one or more augmented or virtual reality applications in computer vision system. For example, the sensor array is arranged and configured to acquire different types of sensor data that are combined and processed using computer vision processes in order to augment a user's physical environment with virtual information.

23 Claims, 15 Drawing Sheets

(56) References Cited

U.S. PATENT DOCUMENTS

| | | | | |
|---|---|---|---|---|
| 2014/0125760 A1* | 5/2014 | Au | .................... | H04N 5/23212 |
| | | | | 348/36 |
| 2014/0285429 A1* | 9/2014 | Simmons | ............ | G02B 27/225 |
| | | | | 345/156 |
| 2015/0234463 A1* | 8/2015 | Miller | ................... | G06F 3/013 |
| | | | | 345/8 |
| 2016/0012855 A1* | 1/2016 | Krishnan | ............ | G11B 27/105 |
| | | | | 386/241 |
| 2016/0133051 A1* | 5/2016 | Aonuma | ............... | G06T 19/006 |
| | | | | 345/633 |
| 2016/0188936 A1* | 6/2016 | Nunnink | ........... | G06K 7/10722 |
| | | | | 235/462.22 |
| 2016/0309134 A1* | 10/2016 | Venkataraman | ..... | H04N 13/243 |
| 2017/0185037 A1* | 6/2017 | Lee | ...................... | G03H 1/2205 |

\* cited by examiner

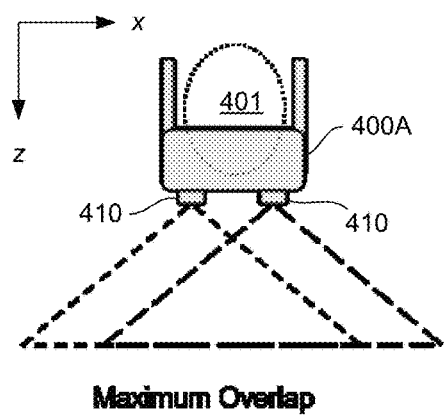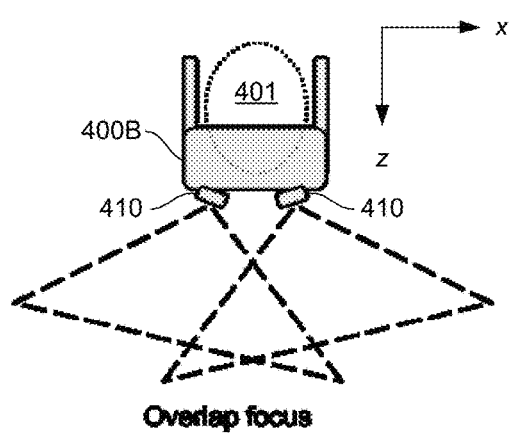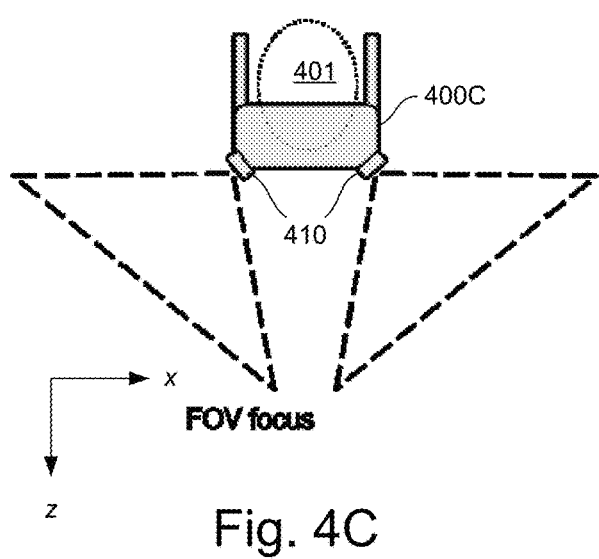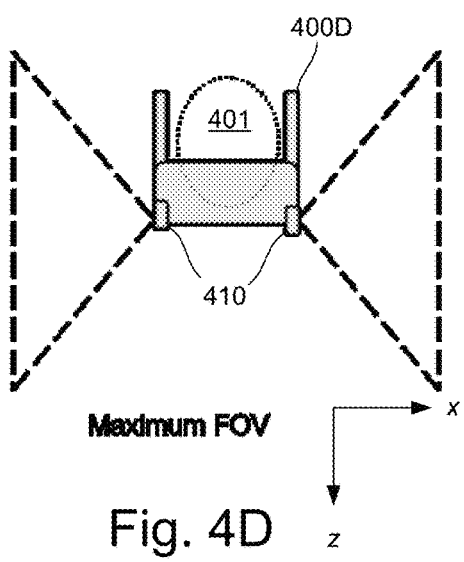
Fig. 4A Maximum Overlap
Fig. 4B Overlap focus
Fig. 4C FOV focus
Fig. 4D Maximum FOV

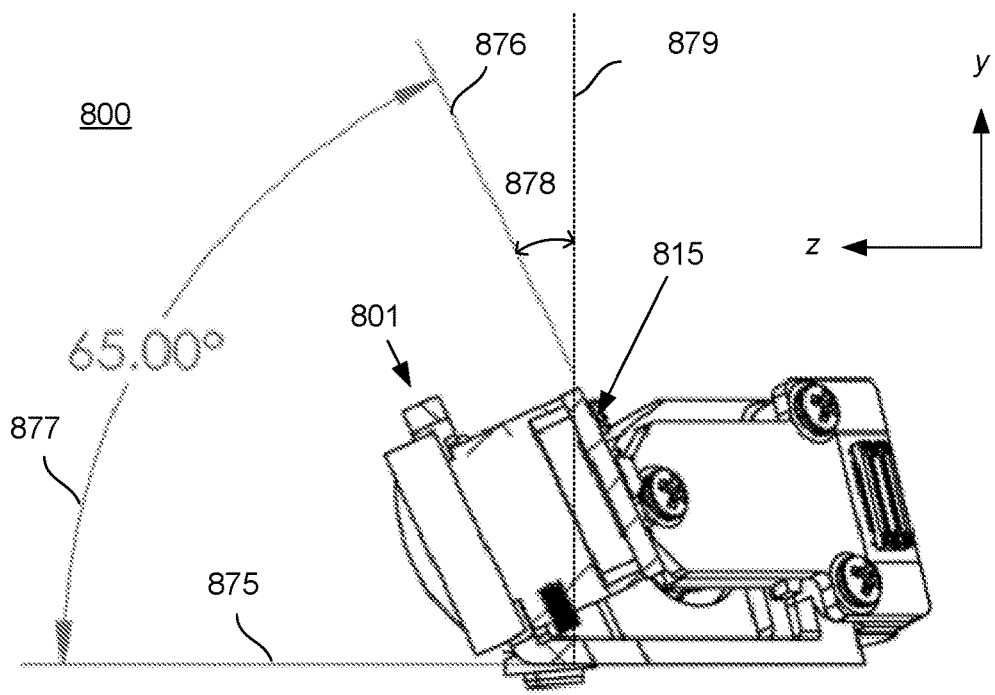
Fig. 8C    Section A-A
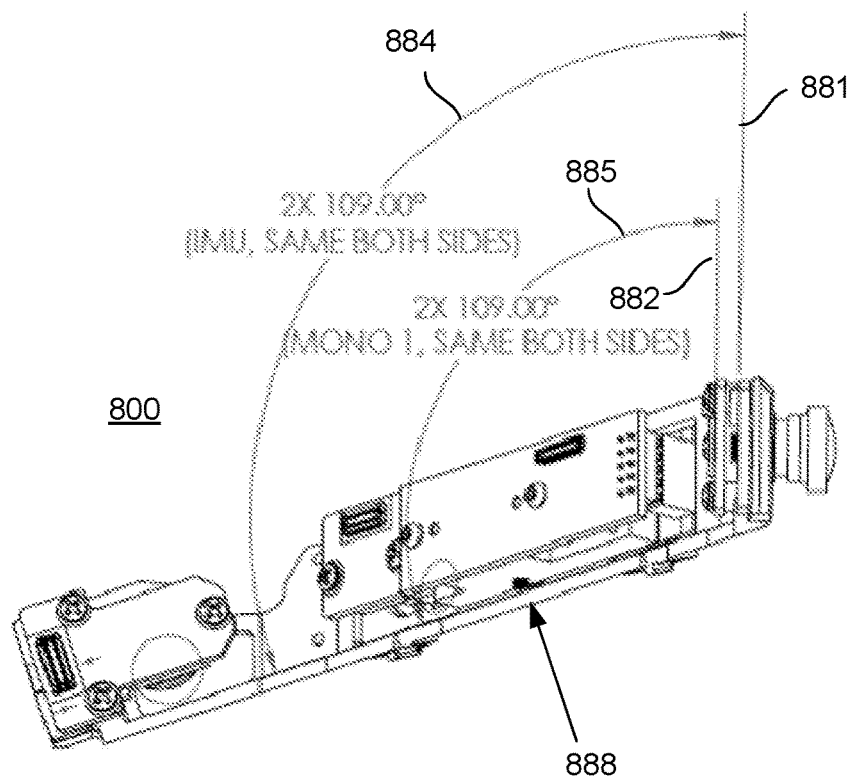
Fig. 8D

APPARATUSES, METHODS AND SYSTEMS FOR A SENSOR ARRAY ADAPTED FOR VISION COMPUTING

CROSS-REFERENCE TO RELATED APPLICATIONS

This application claims the benefit under 35 U.S.C. § 119(e) of U.S. Provisional Application No. 62/302,794, titled "APPARATUSES, METHODS AND SYSTEMS FOR A SENSOR ARRAY ADAPTED FOR VISION COMPUTING" filed on Mar. 2, 2016, in the U.S. Patent and Trademark Office, which is herein expressly incorporated by reference in its entirety for all purposes.

BACKGROUND

The interest in wearable technology has grown considerably over the last decade. For example, wearable virtual reality (VR) displays present virtual images to the user to provide a virtual environment. Now augmented reality (AR) displays are being developed that may be worn by a user to present the user with a synthetic image overlaying a direct view of the environment. Both VR and AR displays are able to present virtual digital content. One example of a virtual digital content is a three-dimensional (3-D) virtual object. VR or AR display systems allow a user to interact with the 3-D virtual object within a virtual space. For example, a user may can select, move, or otherwise interact with a virtual object. Interaction with virtual objects is facilitated by various sensors, which collect data about a user's environment. However, technical challenges exist as to how to select, optimize, and integrate sensors to facilitate perception of and user interaction with a virtual environment.

SUMMARY

Aspects of the disclosed apparatuses, methods, and systems describe various methods, system, components, and techniques that provide a sensor array. In one general aspect, a sensor array includes multiple sensors and is configured and arranged to enable one or more augmented reality applications in an augmented reality system. For example, the sensor array is arranged and configured to acquire different types of data that are combined and processed using computer vision processes in order to augment a user's physical environment with virtual information.

In some examples, the sensor array 101 includes a mechanical holder and/or assembly that holds, arranges, and positions a plurality of sensors in a manner optimized for AR and VR applications. For example, the mechanical holder accepts and holds the sensors and otherwise secures the sensors in relation to the housing of the AR or VR system. In addition, the mechanical holder positions, arranges, and or configures the sensor to sense the user's real world environment, as described in further detail below. The mechanical holder may be implemented as a single element, or be assembled from several elements. In one example, the mechanical holder includes, arranges, and positions multiple sensors. Examples of sensors includes one or more of a monochrome camera, a (Red, Green, and Blue) RGB/color camera, a depth sensor, an inertial measurement unit, and a thermal sensor, among others.

In a general aspect, a sensor array optimized for an augmented or virtual reality system includes a plurality of sensors and a mechanical assembly. The plurality of sensors include two monochrome cameras; a depth sensor; a color camera. The mechanical assembly positions the plurality of sensors in a configuration optimized to sense information for one or more computer vision applications of the augmented or virtual reality system.

The two monochrome cameras may be positioned at opposite ends of the mechanical holder assembly at an angle to sense features in a wide compound field of view and stereoscopically sense features in an overlapping field of view. The compound field of view may be between 200-260 degrees as measured in a horizontal plane. The overlapping field of view may be between 60-80 degrees as measured in a horizontal plane.

The mechanical assembly also may include a first generally planar portion with two opposite ends and two wing portions, each wing portion extending from one of the ends of the first portion and formed of a generally planar portion bent at an angle from the ends of the first planar portion, wherein one of the two monochrome cameras may be positioned through each wing portion to sense features in wide compound field of view and stereoscopically sense features in an overlapping field of view. The angle formed between the first portion and each wing portion in a horizontal plane may be between 120-150 degrees. The angle formed between the first portion and each wing portion in a horizontal plane may be substantially 135 degrees. The angle formed between the planes of the first portion and the plane of each wing portion may be a compound angle. The depth sensor and the color camera may be positioned through the first potion. A lens of the depth sensor may be centered between the two ends of the first portion and a lens of the color camera may be positioned adjacent to the depth sensor.

The mechanical assembly may further include two generally planer wing portions, each wing extending from one of the ends of the first portion, respectively, at an obtuse compound angle formed between the planes of an interior face of the wing portions and an interior face of the first portion, each wing portion positioning one of the monochrome cameras. An angle formed between a wing portion and the first portion in a horizontal plane bisecting the first portion and the wing portion may be approximately 120-150 degrees and the plane formed by interior faces of the wing portions and the first portion may form an angle of approximately 60-70 degrees at the intersection of the plane formed by the interior faces and the horizontal plane.

The sensor array may further include an inertial measurement unit.

The sensor array may further include a thermal sensor.

The sensor array may further include one or more processing devices, the one or more processing devices configured to execute instructions to acquire sensor data from the plurality sensors and aggregate the sensor data for transmission to a host processing system implementing the one or more computer vision applications of the augmented or virtual reality system.

In another general aspect, an augmented reality headset includes a display, an optical element arranged relative to the display to reflect or project light emitted from the display into the eyes of a user of the ARH; and a sensor array. The sensor array includes a plurality of sensors. The plurality of sensors include two monochrome cameras; a depth sensor; a color camera. The sensor array also includes a mechanical assembly positioning the plurality of sensors in a configuration optimized to sense information for one or more computer vision applications of an augmented reality processing system.

The mechanical assembly may further include a first portion having two ends and two generally planer wing portions, each wing extending from one of the ends of the first portion, respectively, at an obtuse compound angle formed between the planes of an interior face of the wing portions and an interior face of the first portion, each wing portion positioning one of the monochrome cameras. An angle formed between a wing portion and the first portion in a horizontal plane bisecting the first portion and the wing portion may be approximately 120-150 degrees and the plane formed by interior faces of the wing portions and the first portion may form an angle of approximately 60-70 degrees at the intersection of the plane formed by the interior faces and the horizontal plane.

The headset may further include an inertial measurement unit.

The headset may further include a thermal sensor.

The headset may further include one or more processing devices. The one or more processing devices may be configured to execute instructions to acquire sensor data from the plurality sensors and aggregate the sensor data for transmission to a host processing system implementing one or more computer vision applications of the augmented or virtual reality system.

The details of various embodiments are set forth in the accompanying drawings and the description below. Other features and advantages will be apparent from the following description, the drawings, and the claims.

BRIEF DESCRIPTION OF THE DRAWINGS

The following description illustrates aspects of embodiments of the disclosed apparatuses, methods, and systems in more detail, by way of examples, which are intended to be non-limiting and illustrative with reference to the accompanying drawings, in which:

FIGS. 4A, 4B, 4C, and 4D show various arrangements of the mono camera positions and orientations;

FIGS. 8A, 8B, 8C, 8D, and 8E show a top view, a font view, a side cutaway view of the front view, a back perspective view, and a bottom view of one example of an implementation of the a mechanical holder assembly and sensors;

DETAILED DESCRIPTION

Overview

Figure 1A:
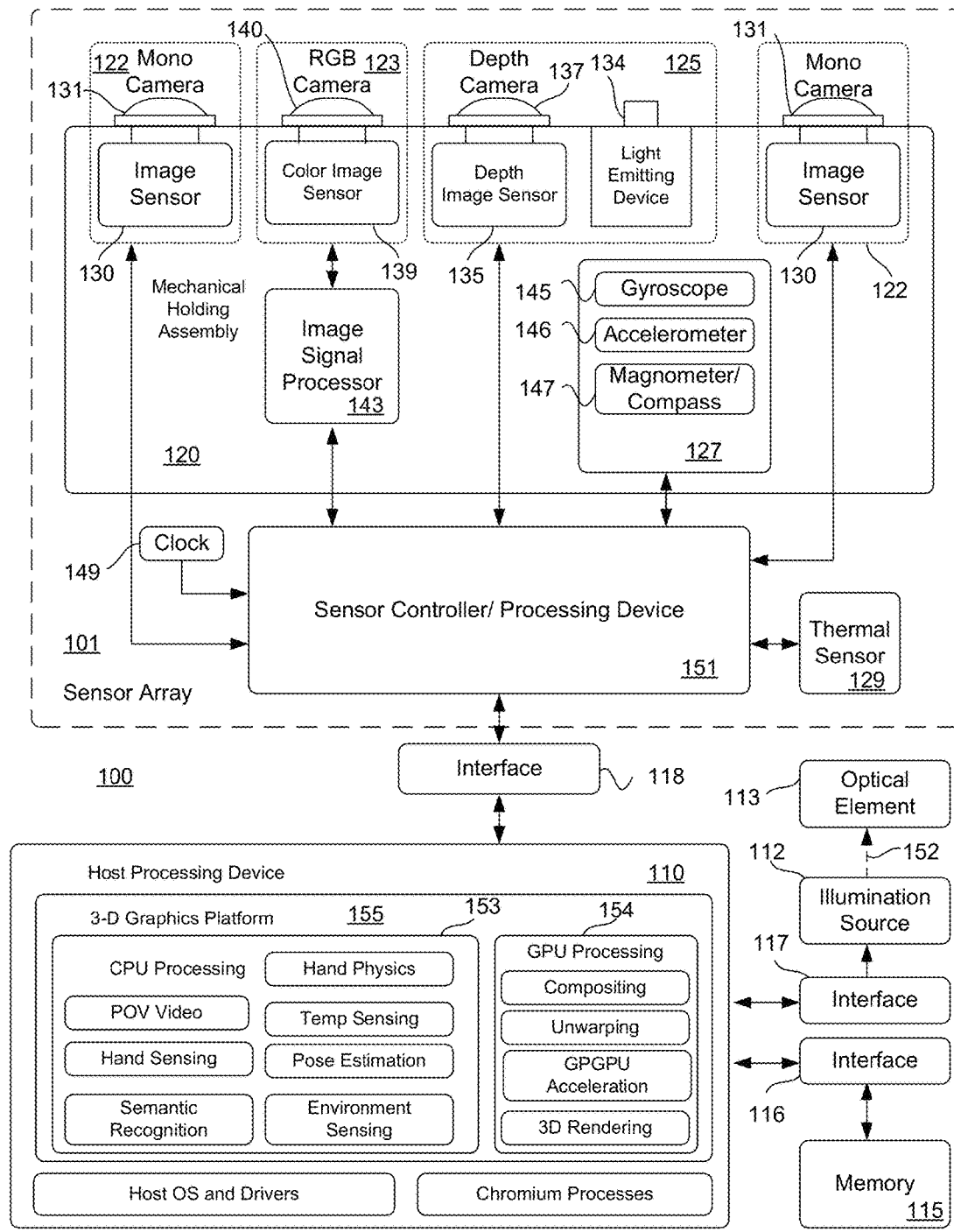
FIGS. 1A and 1B illustrate an example of an augmented reality system.

In one general aspect, an augmented reality system (ARS) or a virtual reality system (VRS) includes one or more sensors, at least one computational device, and other electronic, optical, and mechanical components that provide the display of digital information (e.g., virtual elements) to augment the physical environment of a user (e.g., real world elements as perceived directly by the user in an ARS and/or by a video feed of the user's environment captured in real time in a VRS). In one example, the digital information can be geometrically correlated to the physical environment (e.g., relating the digital information to the user's physical environment) and/or geometrically uncorrelated to the physical environment (e.g., relating the digital information to the user's virtual environment and/or not relating to real world elements).

In one example, an ARS may be implemented as an optical-see-through system (e.g., overlaying digital information directly on a user's optical field using optical mechanisms) and/or a video-see through system (e.g., overlaying digital information on top of a video feed). A system that is worn on a user's head may be referred to as an augmented reality headset (ARH) or a virtual reality headset (VRH). In a video-see-through VRH, the user looks directly at a display of a video feed that has digital information overlaid on the video feed. In an optical-see-through ARH, the digital information is overlaid onto the optical field of the user (e.g., by using one or more optical elements to reflect or project light viewed by a user or by directly projecting information onto the user's retina).

In another general aspect, the ARS seeks to overlay and/or fuse the digital information with the real world to blend the real and the virtual world in a manner that is seamless to a user. For example, the ARS seeks to provide a system with a wide or high field of vision allowing a user interact with the augmented environment in a natural and/or instinctive manner. For example, when a user places a virtual element (such as a computer display screen) on a real world element (such as a desk), the virtual element should appear to the user as though part of the user's environment (e.g., resting on the desk and seen in the user's field of view ("FOV") when looking at the desk and not seen in the FOV when looking away from the desk).

To augment the user's environment with digital information, the ARS processes information about the user's real world environment. For example, a real world environment includes physical features, such as, for example, the shape, and position of real world elements within a user's environment. In one example, the real world elements include a user's hands, which may be used as a source of input to control the ARS. Other examples of real world elements include objects (e.g., furniture, décor, electronics, and appliances), structure (e.g., walls, ceiling, doors, and windows), natural environment (e.g., buildings, transportation, landscape, flora, and weather), and other beings (e.g., people and animals), and the like. In addition, information about the position and movements of a user in relation to the real world elements is used.

In one general aspect, information about a user's real world environment may be collected by one or more sensors. For example, a sensor is an electrical/optical/mechanical device that collects and converts information about a physical quality of the user's environment (such as, for example, light, motion, acceleration, and others) to an electrical/digital quality (such as an array of bits). The conversion of the physical quality into an electrical/digital quality is denoted as "sensing", and is a type of measurement or approximation related to the user's environment. As such, the conversion is subject to measurement errors. As a result, a sensor inherently provides an approximation of the real world. Data from the sensors is provided as input for one or more applications of the augmented reality system. The ARS applications may be grouped into the following categories: environment sensing, pose estimation, semantic estimation, point-of-view (POV) video, and hand sensing.

Providing data for such a system in an ARH, poses a number of technical challenges. For example, it may be desirable for the system to maximize a FOV of a user and seamlessly render virtual elements within the user FOV. In addition, it also may be desirable that the system provide an adequate approximation of the real world environment of the user. For example, the system should accurately sense the features of the real world environment in a real time manner while minimizing or mitigating measurement errors. In addition, it may be desirable that the system provide the input required for any AR applications used to seamlessly render the virtual elements in relation to the real world environment. However, there are non-trivial tradeoffs between the amount of data collected, the number of sensors used to sense the data, the types of sensors used, the configuration and arrangements of the sensors while accounting for the limited area for such sensors in an head mounted system one or more other considerations, such as weight of the system, cost of a system, power consumption by the system, processing power of the system, heat generated by the system, and user comfort while wearing the system for any significant period of time, among others.

In one general aspect, according to the various embodiments and implementations described herein, a sensor array is arranged and configured to acquire different types of sensor data that are processed and/or combined using computer vision processes in order to augment a user's physical environment with virtual information. In addition, a sensor array is provided that includes an optimal number and arrangement of sensors configured to provide data of a sufficient quantity and accuracy for one or more augmented reality applications and/or computer vision processes implementing an augmented reality system. Moreover, the sensor data may be used by multiple computer vision processes to improve those processes. In some implementations, the optimal number and arrangement of multiple sensors described herein maximizes a FOV of a user and allows the ARS to seamlessly render virtual elements within that FOV while optimizing one or more of weight, power consumption, processing power, heat generation, and user comfort, among others. In addition, an optimized sensor array is provided that minimizes overall cost of the system without degradation of overall quality of the visual images presented by the system or the performance of the system.

System Hardware

FIG. 1A illustrates one example of an ARS or VRS 100. The system 100 includes a sensor array 101, a host processing device 110, an illumination source 112, an optical element 113, and a non-transitory storage device 115 in addition to several interfaces 116, 117, and 118.

The sensor array 101 includes a mechanical holder and/or assembly 120 that holds, arranges, and positions a plurality of sensors. For example, the mechanical holder 120 accepts and holds the sensors and otherwise secures the sensors in relation to the housing of the ARH or VRH. In addition, the mechanical holder 120 positions, arranges, and or configures the sensor to sense the user's real world environment, as described in further detail below. The mechanical holder 120 may be implemented as a single element, or be assembled from several elements. In one example, the mechanical holder holds, arranges, and positions multiple sensors. Examples of sensors includes a monochrome camera 122, an RGB camera 123, a depth sensor 125, an inertial measurement unit 127, and a thermal sensor 129.

In one general aspect, a camera includes an image sensor, a lens, and a mechanical fixture (e.g., a lens holder) that holds the lens on the image sensor. The lens holder positions the lens to direct rays of light onto the surface of the image sensor. The lens is an optical unit that can concentrate and direct the light rays on the image sensor. In one example, an image sensor is a device, typically made of CMOS or CCD semiconductor technology that consists of an array of light sensitive elements or "pixels." The light detected may be any electromagnetic radiation sensed by the elements, such as, for example, light in the visible spectrum, the infra-red spectrum or the ultra-violet spectrum to which the sensor is attuned. The camera can provide video or still images. As shown in FIG. 1, the cameras include a monochrome camera, a color camera, and a depth camera.

In some implementations, the sensor array 101 includes two monochrome ("mono") cameras 122. The mono cameras 122 include an image sensor 130 that is optimized for sensing monochrome/grayscale/black-and-white light information (e.g., grayscale video, grayscale still images, etc.). Alternatively, more than two mono cameras can be used. The image sensors 130 are paired with lenses 131 that have a wide field of view (FOV). In one example, a fisheye lens may be used that supports a FOV of approximately 140 to 180 degrees when matched with a compatible image sensor. In one example, the lenses 131 may have substantially the same FOV, such as, for example, approximately 160 degrees.

In some implementations, the mono cameras 122 may be configured to sense features of the user's real world environment. For example, the mono camera 122 may be use to capture images depicting environmental features, such as corners, texture patterns, high frequency textures, lines, sharp edges or other similar entities that can be tracked via computer vision algorithms. Examples of features include Harris corners, Sobel edges, Canny edges, KLT features/ Good Features To Track, Features from accelerated segment test (FAST), (Oriented FAST and Rotated, Binary Robust Independent Elementary Features (BRIEF)) ORB, Simultaneous localization and mapping (SLAM), Binary Robust Invariant Scalable Keypoints (BRISK), Speeded-Up Robust Features (SURF), and the like.

The detected features are processed by computer vision algorithms of various applications implemented by the HPD110 to sense the user's real world environment. For example, information obtained from the mono cameras 122 may be used to determine an object's position and orientation relative to a coordinate system (sometimes referred to as "pose estimation"). The techniques that enable a camera to determine an object's position and orientation in a given environment include, for example, computer visual processes, such as Visual-Inertial Odometry/Navigations, SLAM, Visual-Inertial SLAM, and the like. In one example, to support these techniques (e.g., techniques that track features where the features do not appear to have moved significantly between frames), the mono cameras may have a frame rate of at least 60 frames per second. Of course, higher frame rates (e.g., 120 and greater) may be used when suitably paired computational resources support these rates.

The mono cameras 122 may be arranged by the mechanical holding assembly 120 to provide different area of coverage of features within the real world environment relative to the user. Examples of various configurations of the mono cameras 120 is discussed in further detail below.

In one example, the sensor array 101 includes at least one depth sensor 125. For example, as shown in FIG. 1, the depth sensor 125 includes a light emitting device 134 and a depth image sensor 135. The depth image sensor 135 senses the distance of an object/scene within the real world environment from the user. For example, the depth image sensor 135 senses the distance for each pixel of the image sensor between the image sensor and real world object (or a point thereof). In one example, the depth sensor 125 is a Time of Flight (TOF) Camera.

The depth sensor 125 includes a light emission device or projector 135. The light emission devices 135 illuminates a scene before the sensor with light (e.g., infrared light). The depth sensor 125 measures the time between the emission of light from the device 135 and the returned reflection of light from a real world object that is detected by the depth image sensor 135, which is referred to as time of flight depth sensing. In one example, the light emitting device 135 emits a pre-defined pattern, and the depth of the scene images captured by the sensor 125 are algorithmically converted to a depth image where each pixel contains the depth of the scene (e.g., structured light depth sensing). In one example, the depth sensor includes a wide-angle lens 137. For example, a lens with angle of greater than 100-120 degrees may be used in order to sense an environment similar to that perceived by the vision of a user observing their environment.

While a TOF camera is described above, one skilled in the art will appreciate that other configurations may be used to implement a depth sensor 125. For example, other implementations of the depth sensor 125 may include two or more cameras to form a stereo pair (e.g., using two cameras) or an N-Camera Rig (e.g., using N cameras) that generate video feeds that are algorithmically combined together to yield a depth image. This is referred to as passive stereo depth sensing. In other examples, stereo depth sensing also can be assisted by a light projector that emits a pre-defined pattern and/or a speckle pattern onto the scene to be sensed, to better handle surfaces with a poor texture (e.g., surfaces that do not demonstrate high-resolution texture) and improve the quality of algorithms used to acquire stereo depth. This is referred to as active stereo depth sensing.

The output depth images from the depth sensor 125 are used for hand tracking and environment sensing. In addition, the output may be used for semantic recognition and pose estimation. The output from the depth sensor is used as an input for hand sensing. For example, the depth sensor provides depth values that allow motion of hands and their interaction with digital content to be determined. In addition, the output from the depth sensor is used as an input for environment sensing. For example, the depth sensor 125 provides a representation of the user's environment to form of point clouds of data points, a depth map of environment features, and/or three-dimensional (3D) meshes of the environment of the user. Furthermore, the depth sensor 125 may assist other processes, such as semantic recognition, by sensing information about the shapes of objects and scenes, which are used to differentiate characteristics of the object or the scene. In yet another example, the depth sensor 125 may provide additional data as input to pose estimation resulting in more robust determinations by the HPD110. For example, the depth data may be provided for the implementation of (Red, Green, Blue, and Depth) RGBD SLAM algorithms that combine RGB data with depth information, depth-based SLAM algorithms (such as Kinect Fusion), and also may be used to aid estimation of a scale factor of the trajectory of a monocular SLAM and/or Visual Inertial Navigation system.

User hand positions can change quickly. At the same time, the interaction of the user's hands with the virtual environment should appear smooth to the user. Therefore, in one example, the depth sensor 125 has a frame rate that captures depth images at least 60 frames per second for hand sensing. However, other depth sensing solutions typically need more power to be able to sense objects that are relatively far from the user. Therefore, for a given power consumption, the depth sensor 125 provides a limited sensing range in terms of depth. In order to be able to sense the environment (e.g., environment sensing), as well as hands (e.g., hand sensing), in some implementations, the depth sensor 125 may be function in a long-range mode that operates at a rate lower than 60 frames per second. In this example, a lower frame rate limits the power consumption of the sensor. In one example, a frame rate of 15 frames per second may be used in long range sensing. The depth sensor 125 may be controlled to sense information at both a short ranges (e.g., hands) and long range (e.g., environment). In some implementations, the depth sensor 125 may be controlled to operate in different modes, such as for example, a hand-range mode, a long-range mode, or at an interleaved mode where the sensor returns two depth feeds simultaneously (e.g., every $\frac{1}{60}$ sec provides a near-range image and every $\frac{1}{15}$ sec provides a long range image).

In one example, the sensor array 101 includes a color camera 123 that senses color information about a user's environment (e.g., can transmit color video and/or color still images). In some implementations, more than one color camera 123 can be used. In one example, the color camera 123 is an RGB camera that includes an image sensor 139 that encodes color information using red, green, and blue channels. The RGB camera includes a wide-angle lens 140, for example, a lens with an angle greater than 100-120 degrees.

In one example, the color camera 123 acts as an action camera that mimicks the wide FOV of the human eye. For example, an RGB camera may have a sufficiently high resolution to convey a user's experience accurately. One skilled in the art will appreciate that a high resolution can be computationally intensive if the same camera is used for computer vision processes. Therefore, in some implementations the feed from the color camera 123 may be scaled to a lower resolution (e.g., using algorithms that are implemented in software or hardware) to mitigate use of computational resources.

In one example, a color camera 123 may capture images at a speed of at least 30 frames/second, which is the minimum requirement for persistence of vision of conveyed video. A frame rate of at least 60 frames/second provides a more natural-like visual experience and is able to capture faster user motions. In one implementation, the color camera 123 can be switched between multiple frame-rates, for example, depending on the available computational resources that process the output data.

In one example, the color camera 123 provides a point of view (POV) Video. For example, the POV video may be used to convey the user's experience to another user or device for applications, such as, for example, remote assistance, documentation, recording, cinematography, or any other similar or different application that requires a video stream with or without digital graphics overlaid. In addition, output from the color camera 123 is used to assist pose estimation. For example, output from the color camera 123 may be used to generate data for a SLAM or Visual Inertial Navigation algorithm. In this example, the additional data from the color camera 123 adds robustness to these algorithms because of the overlap of the FOV of the color camera and the area sensed by the mono cameras 122 and the smaller FOV that allows the motion of tracked features to be captured in more detail (e.g., with higher sensitivity). For example, the mono cameras 122 have a relatively very wide FOV and therefore may be have fewer pixels per degree of FOV; whereas, and the color camera 123 has more pixels per degree because of its smaller FOV. In another example, the color camera 123 is used to apply color information to the geometric data recovered by environment sensing. In addition, data from the color camera 123 can assist with hand sensing, for example, as input to hand segmentation and hand detection algorithms. In addition, data from the color camera 123 can support RGBD SLAM algorithms that allow features to be tracked using the RGB data and correlation of those features with a depth value supplied by data from the depth sensor 125. For example, RGBD SLAM may support Pose Estimation by utilizing both the RGB tracked features and their depth. In one example, depth may be assigned to the RGB features using data from camera calibration for extrinsic parameters (e.g., using a process where the relative position and orientation between two cameras is estimated).

The sensor array 101 may include an image signal processing device (ISP) 143. The ISP 143 is an image processor that may be implemented using a specialized digital signal processor (DSP) used for processing the raw feed of images from color camera 123. In some implementations, for example, where the color camera 123 is a POV video device, the color camera 123 generates data that are aesthetically appealing to viewers of the POV video stream. This may be accomplished using an image processing pipeline to process the raw data received from the color camera 123. The ISP 143 may employ parallel processing to increase speed and efficiency and perform a range of tasks. For example, the ISP may perform one or more video processes, such as black level adjustment, noise reduction, white balance, Debayering/Demosaicing, RGB blending, gamma correction, RGB conversion to other formats such as YUV, edge enhancement, contrast enhancement, false Chroma suppression, and like. Use of an ISP 143 to perform these operations relieves the HPD 110 of the associated computational load. In other implementations, the ISP 143 may be implemented outside of the sensor array 101 and/or its functions implemented by the HPD 110.

The sensor array 101 may include an Inertial Measurement Unit (IMU) 127. In one example, the IMU includes a gyroscope 145, an accelerometer 146, and a directional sensor 147 (e.g., magnetometer or compass). The gyroscope 145 may provide data used to sensing the angular velocity of the user. The accelerometer 146 may provide data used to determine linear acceleration of the user. The directional sensor 147 may detect magnetic fields used to determine a direction a user is facing.

In one example, data provided by the IMU 127 is used to provide real-time data to the SLAM and Visual-Inertial Navigation, as part of a sensor fusion system that fuses visual data with gyroscope and accelerometer data. In one example, the IMU 127 is positioned and oriented behind one of the mono cameras in order to facilitate the extrinsics (e.g., parameters that define the relative position and orientation between two sensors) calibration processing in production of the sensor array 101 and processing of the data in various algorithms implemented by the HPD110. In one example, the IMU 127 has a high frame rate, such as at least 400 frames/second. In addition, the IMU 127 has a measurement range of, for example, at least plus or minus 2G for linear acceleration and at least plus or minus 500 deg/sec for angular velocity.

In one example, the sensor array 101 may include a thermal sensor 129, such as a thermometer or a thermal camera (e.g., where each pixel of the image sensor senses temperature). Since the sensor array 101 is a system of electronic components, which may be confined to a limited space, the components of the array can become hot (e.g., having temperature approaching tolerances of one or more system components) after prolonged use or in certain operating conditions or environments (e.g., outdoors vs. indoors, summer vs. winter). High temperatures can affect the sensors and quality of data produced by the sensors. For example, high temperatures may cause measurement errors and/or noise. In some implementations, the thermal sensor 129 provides data indicating the temperature of the sensor array 101 and/or one or more of its components to help regulate the internal functions of sensor array 101 and/or the device in which the sensor array 1010 is installed, and thereby control temperature using a temperature sensing/control application.

The sensor array 101 also includes a universal clock 149. In one example, all the data captured by the sensors of the sensor array is timestamped using the clock 149. In this example, the clock performs with a microsecond accuracy range. Time stamping the data with the universal clock 149 allows applications and their algorithms that use data from more than one sensor to use and/or fuse the data together. For example, a pose estimation algorithm determines the pose of a user by estimating the motion of the cameras over time. Therefore, if one sensor (e.g., one mono camera) acquires data at a point in time, and another sensor (e.g., the IMU) acquires data during at a second point in time, or if the sensors acquire data at a different frame rate, in order to combine these data using a sensor fusion technique (such as a Kalman Filter, EKF, and the like) both streams of data have to be sensed within a same or given frame of time. If every time a sensor frame is captured the frame is accompanied with a timestamp from the universal clock 149, the timestamp serves as a reference to synchronize frames from the sensors as need by the vision applications.

In another example, some sensors may acquire data simultaneously. For example, the two mono cameras may be synced to capture images at the same time (e.g., used as a stereo pair) to infer 3D information from their surroundings (such as inferring the 3D position of features that exist in their overlapping FOV). Similarly, depth and RGB data may be combined into a single RGBD image that is useful for environment sensing and Pose Estimation using RGBD SLAM.

The sensor array also includes a computational system designed to transfer the digital information that each sensor generates to other computational systems for further processing, for example, by computer vision algorithms and applications. In one implementation, a sensor controller/processing device ("SCPD") 151 is configured to receive data input from the mono cameras 122, the color camera 123 (e.g., via the ISP), the depth sensor 125, the IMU 127, and the thermal sensor 129. The SCPD 151 may be implemented using one or more of an on-board processing device (e.g., a chip or a chipset), such as a Field Programmable Gate Array (FPGA), an application-specific integrated circuit (ASIC) chip or a general-purpose chipset, or other processing device. The SCPD 151 performs various processes, such as, for example, a sensor array data aggregation process and a sensor array control process. In one example, the SCPD 151 may be implemented by more than one device, for example, one device may implement data aggregation, and another device may implement sensor control.

A communications interface 118 is provided between the sensor controller processing device 151 and the HPD 110 to facilitate the communication of information between the SCPD 151 and the HPD 110. For example, data, such as sensor data and control signals may be exchanged between the SCPD 151 and the HPD 110 via the interface 118. In some implementations, the sensors of the sensor array 101 are selected to implement an augmented reality system for the user by providing input for various applications implemented by the HPD 110, as explained in further detail below.

In one example, the SCPD 151 aggregates the data from all the sensors into a data stream. The data stream may be provided to other devices, such as, for example, a host system via a communications interface 118. The SCPD 151 is operatively coupled to each sensor to communicate with the sensor. For example, the SCPD 151 includes one or more interfaces (such as Mobile Industry Processor Interface (MIPI), high-speed serial interface (HiSPi), Low-Voltage Differential Signaling (LVDS), parallel, I2C, and the like) that are coupled to the output of the various sensors to read data from the sensors and/or configure or control the sensors. The SCPD 151 receives an input from the universal clock 149 to provide timing for the system and to implement the time stamp described above. The SCPD 151 may include one or more storage devices or buffers (not shown), which are used to manage the collection and aggregation of data from the sensors and apply a timestamp to each frame of data received from a sensor. The SCPD 151 continuously reads and buffers data from each sensor. The buffered data is then packaged into a communications format compatible with the interface 118. The packaged data is then periodically transmitted to the host system as input for processes implemented by the HPD110, such as, for example, computer vision algorithms and AR applications. For example, the data may be packaged and sent to the host system using interfaces, such as USB3.0, USB3.1, USB2.0, Ethernet, PCI, Thunderbolt, and the like.

The SCPD 151 also controls and configures the sensors of the sensor array 101. For example, the SCPD 151 sends configuration signals to the sensors to set the sensors to perform sensing functions using specific settings, such as a frame rate, a data range, a precision, a resolution, and the like. The sensors also may provide feedback and/or acknowledgement signals in response to the controls and configurations.

The system 100 also includes one or more client processing devices, interfaces, storage devices, among other components. As shown in FIG. 1, for example, the system 100 also includes an HPD 110, a non-transitory storage device 115, an illumination source 112, an optical element 113, and several interfaces 116, 117, and 118 for communication between the various devices.

The HPD 110 is configured to execute instructions stored and/or accessed from a non-transitory machine-readable storage medium (e.g., 115) used to encode or store the executable instructions. The instructions may include various processes, programs, software, code, and the like that cause the processing device to carry out the operations described in detail below. Instructions and data may be read from and written to the storage medium 115 via interface 116. One skilled in the art will appreciate that the HPD 110 although shown as single entity, may be implemented using two or more processing devices, such as, for example, a central processing unit (CPU) 153 and a graphics processing unit (GPU) 154, among other configurations as described below. For example, the HPD may execute operations to implement an operating system, various drivers, a web browsing application, and a 3-D graphics engine/rendering platform. Graphics generated by the HPD 110 may be provided to the illumination source 112 via the interface 117 to generate light 152 for the optical element 113.

As shown in this example, the HPD110 implements a 3-D graphics engine or platform 155 (e.g., Unity, Unreal, or WebGL), which may include one or more of a rendering engine ("renderer") for 3D graphics, a physics engine or collision detection (and collision response), sound, scripting, animation, artificial intelligence, networking, streaming, memory management, threading, localization support, scene graphs, and may include video support for cinematics. The graphics engine renders images stereoscopically using shaders, which run on the graphics processing unit (GPU) 154. In addition, browser processes (e.g., Chromium) may be used to render web content from online publishers into RGB buffers, which are texture mapped onto panels or frames in the 3D workspace. In one example, virtual elements may be represented as mesh geometry and rendered in the shaders according to a model of the virtual element as specified by the virtual element descriptor including one or more of parameters, geometries, materials, metadata, and/or other attributes and the like. These different buffers are rendered stereoscopically then composited together and into left and right eye buffers (not shown). Finally, the left and right eye buffers are pre-warped with the inverse of the geometry of the optical engine to create the final left and right eye images. Audio may be rendered according HRTF models so that sound emitted from objects localized to the user, given the relative location of four speakers on the system (not shown) to the pinna of the middle ear. In this example, the 3-D graphics engine or platform manages the state of the 3-D virtual space perceived by a user. Virtual elements may be rendered with a 3-D virtual space according to virtual coordinates and/or to corresponding physical world coordinates using positional tracking, which localizes the user to the physical environment.

The 3-D graphics engine or platform 155 includes coding that, for example, pulls the data frames from the host drivers and places frames into queues for hand interaction and positional tracking algorithms to consume. Hands interaction algorithms consume depth frames generated from data received from the sensors to create a point cloud from which it computes interaction forces or hand feature tracking to determine user inputs (such as user gestures). Positional tracking algorithms consume IMU and camera frames to localize the user in the environment using a SLAM algorithm. In this example, data is acquired from the sensors. In one example, a sensor acquisition board timestamps, frames, and packages the data and sends the data over a USB connection to the client processing device. In this example, the IMU includes a gyroscope and accelerometer, which may facilitate determining the orientation of the user.

The host operating device 110 implements a number of applications to provide the system 100. The following examples and implementations, these applications are grouped for ease of explanation into the following categories: hand sensing, environment sensing, POV video, pose estimation, and semantic recognition. In one example, the sensors of the sensor array are selected to implement an augmented reality system for the user by providing input for these applications.

Hand sensing senses the user's hands as a form of input. The sensing can include hand tracking, hand physics, hand pose recognition, gesture detection, finger tracking, and the like.

In some implementations, simulated manipulation of virtual content in an augmented reality environment may be based on user input and/or other input. For example, user input may comprise gesture-based input and/or other input. In some implementations, gesture-based input is based on tracking of one or more human features of a user. For example, gesture-based input may be based on tracking one or more of a hand, an arm, a torso, and/or other features of a user. By tracking one or more hands of a user, gestures including one or more of reaching, grabbing, releasing, touching, swiping, pointing, poking, and/or other gestures may be identified. The identified gestures may be provided as input for simulating manipulation of virtual content within a user's field-of-view. For example, an identified gesture may be correlated to a perceived position of a virtual element within a user's field-of-view. The virtual element may be configured to react to the gesture in an interactive manner. In another implementation, a discrete gesture may be used. For example, when a virtual element is in focus (using the gaze of a user or some other selection process) a recognized discrete gesture could trigger the manipulation of the active virtual element.

In another example, user input associated may be determined when at least one sensor of the sensor array determines that the translated position of a real-world object, such as a hand or finger, into the 3-D virtual space enters an interactive boundary or mesh of a virtual element. In this example, the display system determines the force exerted on the virtual element by the translated real-world object according to certain parameters associated with the interactive boundary of the virtual element. The virtual element responds based on the properties assigned to the virtual element and based on the properties of the virtual environment in which the virtual element and translated real-world object are present.

Environment sensing senses the user's environment and geometrical structure as a form of input and output. The sensor array 101 provides data as input to an environment sensing application. For example, data from the depth sensor 135 is used by the application to determine the location of features within the user's environment. Data input from the color camera 123 also may be in feature detection. In addition, results from pose estimation may be used as input for the environment sensing. For example, pose estimation provides the position and orientation of a system in a global reference frame, and therefore facilitates the aggregation of geometric information in the same reference frame. For example, if a wall is sensed in front of the user, and the system determines the pose is $A(x,y,z,Rx,Ry,Rz)$; similarly, after moving if a table is sensed in front of a user, and the system determines the user's pose is $B(x',y',z',Rx',Ry',Rz')$, then the system is able to determine where the table is with respect to the wall by using the relation of the two poses as a proxy.

POV video conveys the view of the user to other users. For example, the POV video is a video stream of what the user can see (e.g., either augmented with digital content or not) is sent to another user (e.g., a user of an augmented reality device or other computer with display). The output of the color camera 123 and ISP 143 are provided as input to the POV video. In addition, digital augmentation of the video can be rendered based on the virtual elements provided to the user streaming the POV video and the result is transmitted with the video stream. As a result, the POV video conveys the user's experience. For example, if the user of an ARH experiences an optical augmentation, the POV video system is able to convey this experience to other people by creating a digital video augmentation that resembles the user's optical augmentation.

Pose estimation may be used to determine the position and orientation of the ARH so that computer graphics can be virtually attached to the environment. For example, one might elect to create the illusion that a digital vase (e.g., a virtual element) should appear to be always placed on a physical table (e.g., a real world object). Knowing the position and orientation of the ARH with respect to the table in a single coordinate frame allows the 3D graphics rendering platform to create a perceived virtual elements are attached to the physical environment. The lack of such knowledge of the position and orientation of the ARH can result to the digital content giving the perception that the content is following the user. Pose estimation may be implemented and/or assisted by techniques, such as SLAM, Localization, Mapping, Visual Odometry, Visual-Inertial Odometry, Visual SLAM, Visual Inertial Navigation, Visual Navigation, Structure from motion, Iterative Closest Points Point Cloud Registration, RGBD SLAM, among others. Examples of these are provided in: "Review and classification of vision-based localization techniques in unknown environments" by Ben A Amani et al., IET Radar, Sonar & Navigation, 2014; "Visual simultaneous localization and mapping: a survey Artificial Intelligence Review" by Jorge Fuentes-Pacheco et al. Artificial Intelligence Review, Volume 43, Issue 1, pp 55-81 January 2015 First online: 13 Nov. 2012; "The SLAM problem: a survey," by Josep Aulinas et al., Proceedings of the 2008 conference on Artificial Intelligence Research and Development: Proceedings of the 11th International Conference of the Catalan Association for Artificial Intelligence, Pages 363-371, IOS Press Amsterdam, The Netherlands, The Netherlands ©2008, "3D indoor scene modeling from RGB-D data: a survey" by Kang Chen et al., Computational Visual Media, December 2015, Volume 1, Issue 4, pp 267-278; and "KinectFusion: Real-Time Dense Surface Mapping and Tracking" by Richard A. Newcombe et al., ISMAR '11 Proceedings of the 2011 10th IEEE International Symposium on Mixed and Augmented Reality, Pages 127-136, October 26-29, 2011, IEEE Computer Society Washington, D.C., USA ©2011 which are hereby incorporated by reference in their entirety.

As appreciated herein, monochrome/grayscale cameras typically demonstrate higher light sensitivity and higher dynamic range than color sensors because there is typically more surface area on the image sensor per pixel of the monochrome device. For example, RGB sensors sense different color channels per pixel whereas mono cameras do not make this separation. Therefore, for the same pixel size mono cameras are desired for pose estimation because the aforementioned characteristics can provide a superior feature detection performance.

Semantic recognition provides object detection, scene classification, and ambient color/light detection. An object detection algorithm may identify the location of a pre-defined object in space. For example, the algorithm may infer the existence and potentially the location of a second augmented reality headset user who is located nearby (e.g., where the cameras of each headset can see each other), given a description of the headset. Scene classification is an algorithm that yields a description of what is seen by the user. For example, a scene classification algorithm may understand what the user is looking at (e.g., whether the user is looking at a crowd of people or at a desk). Marker/Pattern tracking is a computer algorithm that may identify the position and orientation of a pre-defined item, such as a printed barcode, marker, drawing, textured image, and the like. Ambient color/light detection is a computer algorithm that yields statistics about the lighting of a scene, for example, detecting whether the system 100 is located in a dark or in a bright room, based on the detected light intensity.

Data from the one or more thermal sensors 129 may be provided for temperature sensing. Temperature sensing determines the temperature of the system and/or its components and prevents overheating by alerting the processing devices to high temperature events. In one example, the temperature sensing application instructs the processing devices to change the system and/or array operation to help reduce or mitigate the system and/or component temperatures. In addition, the system may control venting and/or operation of a heat sink or fan to control system temperatures.

As described above, the ARS also includes a light source, and an optical element for generating the virtual content that is perceived within a three-dimensional virtual space. In some implementations, one or more of the light source, optical element, and/or other components may be incorporated into a head-mounted display system. Light emitted from the light source as a beam may be reflected or partially reflected off or through the optical element into a user's eye to provide a virtual reality or augmented realty, respectively. Light from the beam may be part of light generated by light source to depict a digital image corresponding to virtual content as rendered by a processing device of the client system and perceived by the user as a virtual image within the three-dimensional space.

Figure 1B:
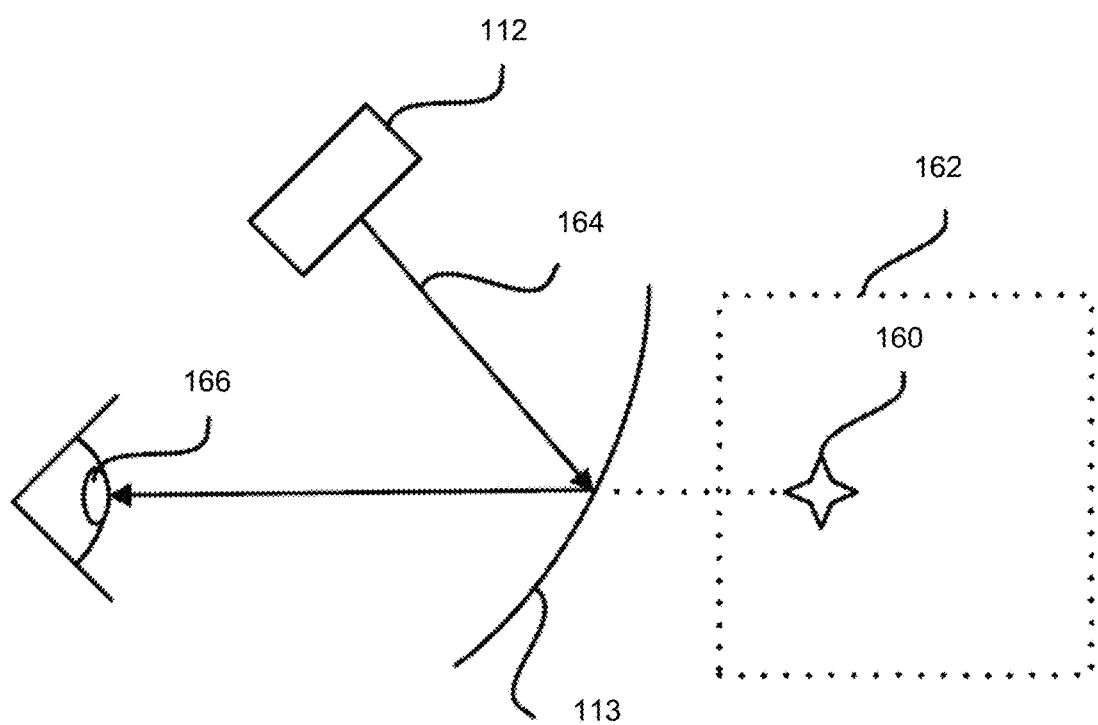

By way of non-limiting illustration, FIG. 1B shows an exemplary configuration of a light source 112 and an optical element 113 of the system 100 for generating virtual content 160 that is perceived by a user within a three-dimensional space 162. In some implementations, one or more of the light source 112, optical element 113, and/or other components may be incorporated into a head-mounted display (HMD), and/or other devices, an example of which is provided below. FIG. 1B shows a light beam 164 emitted from light source 112. In some examples, the light source may be one or more displays. For example, the light source 112 may comprise one or more of a liquid crystal display (LCD), a light emitting diode (LED) display, surface-conduction electron-emitter display (SED), a plasma display, a transparent organic light emitting diode (OLED) display, a MEMS mirror based display, liquid crystal on silicon (LCoS) display. Other examples of light sources 112 include a digital light projector (DLP), a laser, an RGB laser, and/or other light sources. The display receives image/pixel data from the HPD110 and/or graphics processor to render an image. An individual light source 112 may comprise an array of addressable optical components. Each individual optical component may be controlled to affect one or more aspects of light to create digital images. For example, individual optical components of a display may be individually controllable to affect one or more of transmissivity, brightness, generation, reflection, refraction, and/or other aspects of light to create images.

The light beam 164 may reflect off an optical element 113 into a user's eye 166. The light beam 164 may be part of light generated by the light source 112 to depict a digital image. The digital image may correspond to the virtual content 160. In some implementations, position of light source 112 may be incrementally adjusted to obtain incremental adjustments to a perceived range of virtual content 160 within three-dimensional light field 162. In some implementations, the depth and/or bounds of three-dimensional light field 162 may be limited by an adjustable range of light source 112 being closer to and/or farther from optical element 113. It will be appreciated that other configurations are also possible. For example, in some implementations of a VR HMD, the beam 164 from the illumination source 112 may be directed at the user's eyes 166. In some examples, a waveguide (not shown) may be used to provide the light from the illumination source 112 to the eyes 166 of the user.

Sensor Array Logic

Figure 2A:
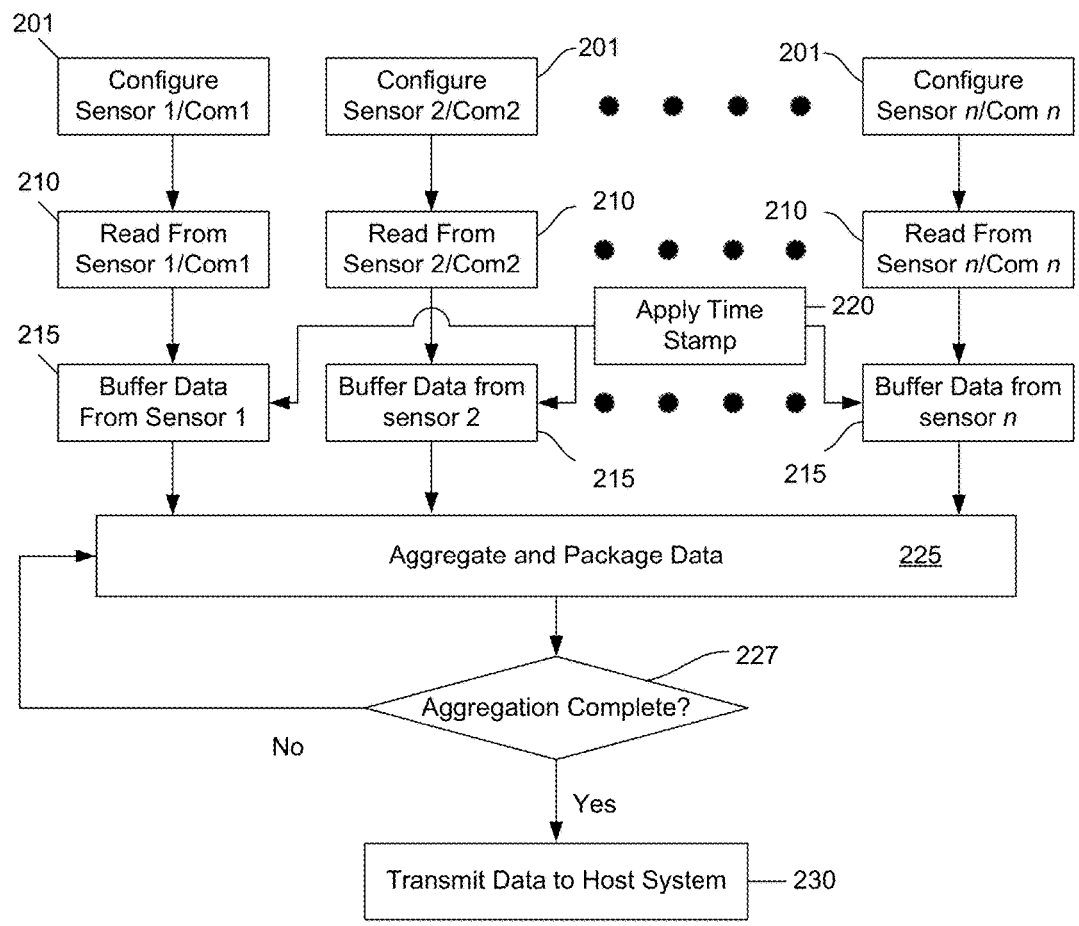
FIGS. 2A and 2B show examples of process flows from the sensor array processing device.
Figure 2B:
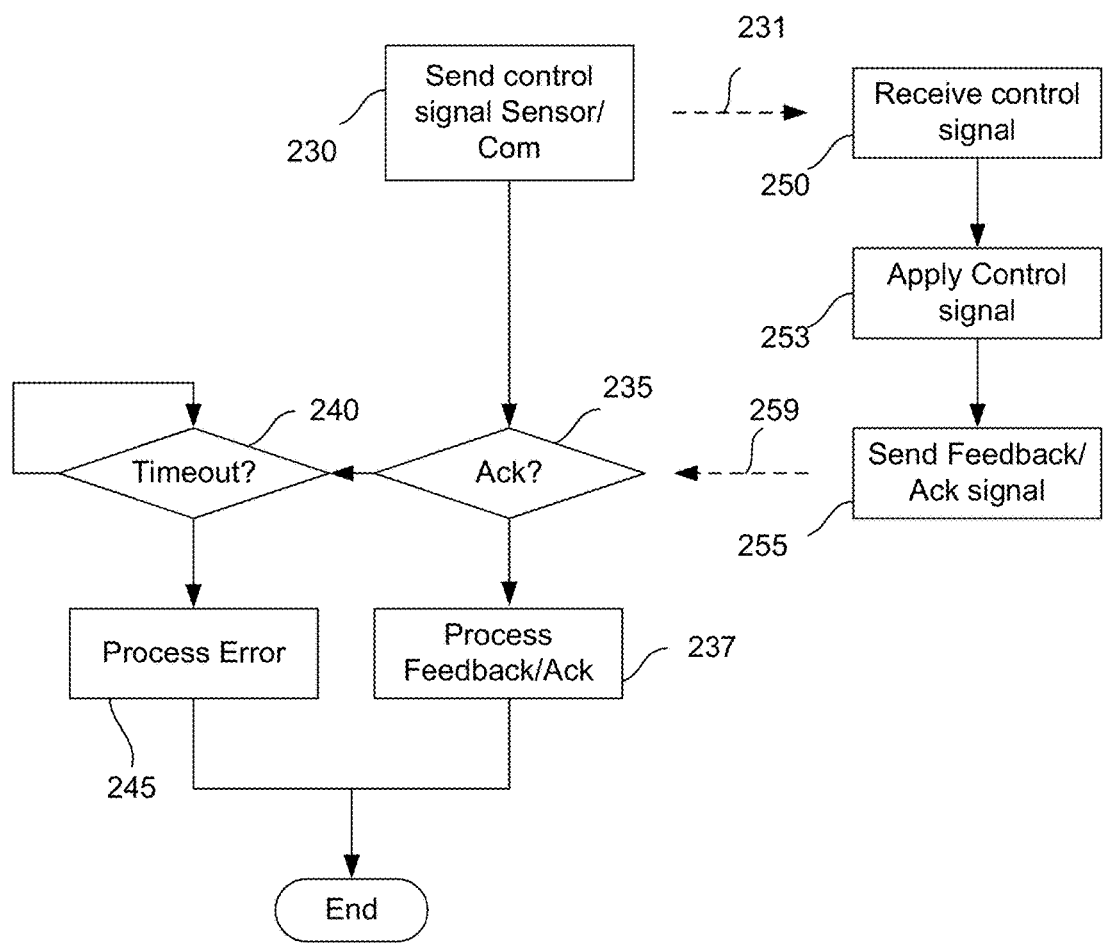

FIGS. 2A and 2B show examples of process flows that may be implemented by the sensor array system 101. FIG. 2A shows an example of a sensor array data aggregation process. In one example, this process may be implemented by the sensor array processing device 151.

In operation 201, the SCPD configures a sensor with initial settings for operation of the sensor. The sensor is identified and the communications port (e.g. Com1-$n$) is specified for communication between the sensor and the SCPD. In operation 210, the SCPD 151 reads data from the sensor using the corresponding communications port of the interface of the SCPD coupled to the sensor. In operation 215, the data from the sensor is read into a buffer, and a time stamp is applied to each frame of data from the sensors, in operation 220. The operations 201-220 are performed for each sensor of the sensor array 101, such as the mono cameras 122, the color camera 123 (e.g., via the ISP 143), the depth sensor 125, the IMU 127, and the thermal sensor 129, and any other sensors provided.

In operation 225, the data is aggregated from the buffer and packaged for transmission to the host processing system. Periodically, the SCPD 151 in operation 227 determines whether the current aggregation of data is complete. If complete, in operation 229 the SCPD transmits the data pack to the host system for processing by the computer vision and augmented reality applications.

FIG. 2B shows and example of a sensor array control process for the SCPD and a sensor. The control process may be performed for each sensor of the array, such as, for example, the mono cameras 122, the color camera 123 (e.g., via the ISP), the depth sensor 125, the IMU 127, and the thermal sensor 129, and any other sensors provided.

During the SCPD control process, in operation 230, the SCPD 151 sends a control signal 231 formatted for a particular sensor (n) on the communication port (e.g., com (n)) of the SCPD 151 corresponding to the sensor (n). The control signal may configure the sensors to perform sensing functions using specific settings, such as a frame rate, a data range, a precision, a resolution, and the like that are used during the sensing or capture of data. In operation 235, after sending the control signal the SCPD 151 waits for feedback or acknowledgement from the sensor. If an acknowledgement signal ("Ack") is received, in operation 237 the SCPD 151 processes the feedback (e.g., determining the signal was successfully applied or processing of an error signal). If no acknowledgement signal is received, in operation 240 the SCPD determines whether a timeout has occurred. If a timeout has occurred, in operation 245 the SCPD 151 processes an error signal (e.g., determining whether to resend the control signal to the sensor).

During the sensor control process, in operation 250 the sensor (n) receives the control signal 231 from the SCPD 151. In operation 253, the sensor (n) attempts to apply the control signal to operation of the sensor. In operation 255, the sensor (n) then responds with a feedback signal 259 acknowledging the signal was successfully applied or the occurrence of an error.

Sensor Array Configuration

FIGS. 3, 4, 5, 6, 7, 8A-G, and 9A-C show illustrations of various configurations of the sensors of the sensor array 101.

The sensors of the sensor array 101 may be positioned by the sensor array 101 and the device in the sensor array 101 is housed (e.g. an ARH) in various configurations designed to optimize, enhance, or otherwise facilitate collection of data for use by the computer vision algorithms and AR applications and/or to improve the AR experience by a user of the ARH or other computer systems.

A user's FOV generally denotes the visual volume seen by the eyes of a user at any one instance of time. In addition, the ARH FOV denotes a volume in which digital information may be presented overlaying the real environment seen by the user of the ARH.

In addition, each camera of the sensor array has a FOV. The FOV is a volume in which data is sensed by the camera at any one instance of time. In some implementations, the volume may be measured or illustrated by an angle defining a cone extending from the camera. In one example, the FOV of a sensor, such as a camera, correlates to the lens of the camera.

Figure 3:
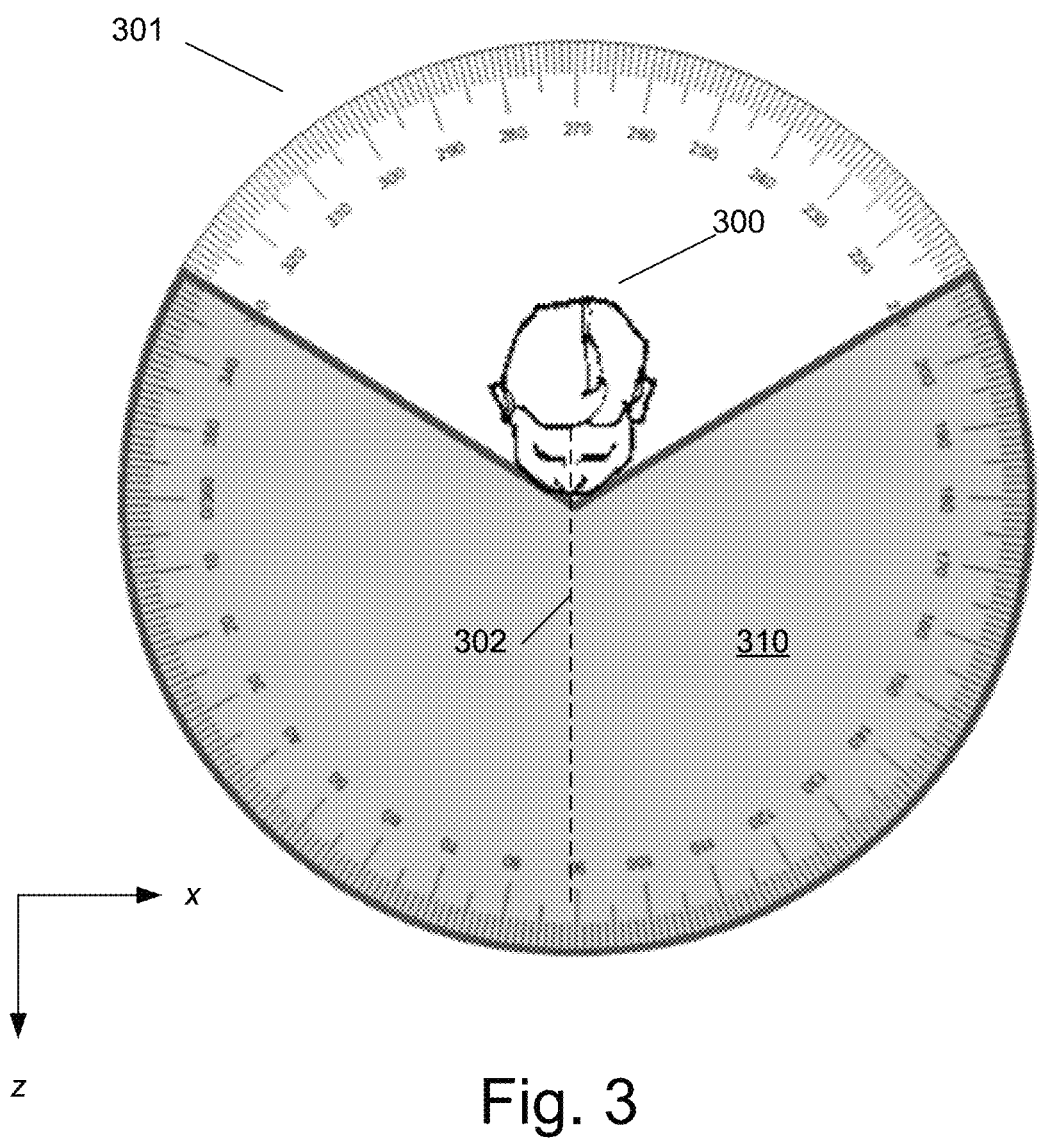
FIG. 3 shows an overhead view of a user environment.

FIG. 3 shows an overhead view of a user 300 and surrounding environment. In one example, an AR system is designed or optimized when it uses or senses objects and/or features in a Horizontal FOV (HFOV) that is wider area than a user's HFOV. As shown in the example of FIG. 3, a compass 301 is illustrated in a horizontal x-z plane parallel to the plane formed by three points of the eyes and bridge of the nose of the user. A centerline 302 extends from the user in the plane bisecting a shaded area 310. The shaded area 310 illustrates one example of a HFOV for feature sensing of the AR system. For example, the HFOV for sensing features (e.g., used in pose estimation) may be up to 240 degrees, as illustrated in FIG. 3.

Mono Cameras

As described above, in one implementation of the sensor array 101 two mono cameras 122 are used (e.g., a left Mono camera and a right Mono camera). The use of two mono cameras may be selected to increase the HFOV of the system. In one example, a compound FOV of the two mono cameras is the union of the FOV of both cameras, and an overlapping FOV of the two mono is the region that can be seen by both cameras. In another example, more mono cameras can be employed in order to achieve an even wider Compound HFOV; however, this may increase power consumption, real estate within the array, and processing consumption, in addition to resulting in extra weight, heat, and expense.

In one example, maximizing the HFOV is beneficial for the pose estimation algorithms. For example, by providing a HFOV of approximately 240 degrees the sensors are optimized for an average sized room allowing the system to sense and map 3 out of 4 walls of a space in many instances. Therefore, in one example, fisheye lenses are employed for the monochrome cameras 122. For example, these lenses achieve a very wide FOV, such as approximately greater than 160 degrees. In order to maximize the compound HFOV (which is the union of the FOV of both cameras) the cameras are placed at the regions of the headset corresponding to the temples of a user. This placement allows rotation in relation to the horizontal x-z plane (e.g., shown in FIG. 3) outwards from the centerline 302 so that the compound FOV of the cameras is increased and may provide the 240 degrees of coverage within the horizontal plane corresponding to the shaded area 310. As mentioned, the increased compound FOV is beneficial for the Pose estimation algorithms because these algorithms frequent rely on tracking specific features of the environment, such as corners, texture patterns, high frequency textures, lines, sharp edges, or other similar entities that can be tracked via computer vision algorithms and the compound FOV provides enough data to map a sufficiently large area of the user's environment.

At the same time, an overlapping FOV for the mono cameras allows the two mono cameras to work as a stereo pair. When operating as a stereo pair, the cameras allow detection of features seen by both cameras. The stereo data input from both of the cameras facilitates determination of the 3D position of the detected features by employing stereo vision algorithms. In general, by providing an overlapping field of view of a stereo pair, detection and mapping with the 3D volume is enhanced for the area generally of most importance to a user (e.g., where the user is focused or looking).

Although described in terms of the HFOV for reference of the orientation of the cameras, it will be appreciated that the cameras sense their environment in a volume, such as a cone extending from the vertex or apex located at the lens/image sensor of the camera. The volume of the cone is determined by the FOV angle of the lens of the camera.

FIGS. 4A, 4B, 4C, and 4D show various arrangements of the mono camera positions and orientations that give different emphases to an overlapping HFOV versus a compound HFOV. As shown in FIGS. 4A, 4B, 4C, and 4D, ARHs 400A, 400B, 400C, and 400D are worn by a user 401. Each ARH includes two mono cameras 410. FIG. 4A shows a first arrangement of the mono cameras 410 space apart and facing forward to provide a greater overlapping HFOV region in the x-z plane. FIG. 4B shows a second arrangement wherein the mono cameras 410 are angled away from a centerline to provide a wider compound HFOV with less overlap HFOV in the x-z plane. FIG. 4C shows a third arrangement wherein the mono cameras 410 are positioned further apart and at a greater angle from a center line to provide yet a wider compound HFOV with minimal overlap HFOV in the x-z plane. FIG. 4D shows forth configuration of the mono camera 410 providing a maximum compound HFOV with no overlap in the x-z plane.

Figure 5:
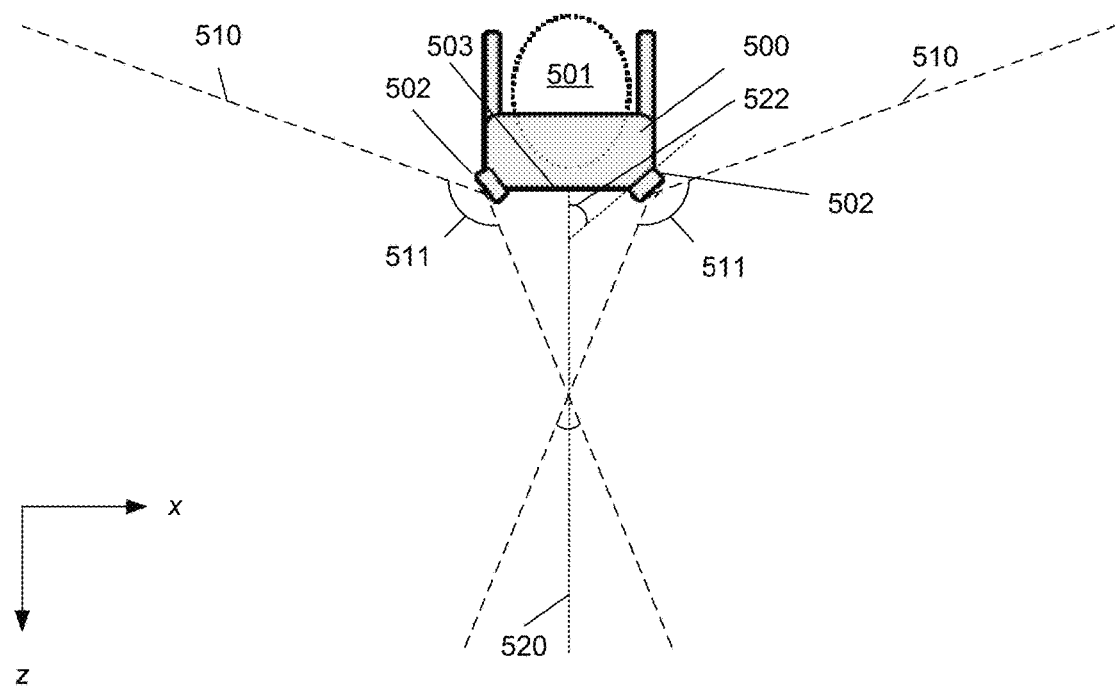
FIG. 5 illustrates one exemplary configuration of the mono cameras of an augmented reality system.

FIG. 5 illustrates one exemplary configuration of the mono cameras of an ARH 500 with regard to the HFOV in the x-z plane. The ARH 500 is worn on the head of a user 501. According to the arrangement shown in FIG. 5, a mono camera 502 is generally disposed at each temple region of the user 501. For example, each mono camera 502 is placed at the opposite end of straight line 503 drawn between the cameras in the horizontal x-z plane (e.g., roughly corresponding to a length of a front surface of the ARH along the forehead of a user 501). The HFOV of each camera 502 is illustrated by the dotted lines 510 and horizontal angle 511. In one example, angle 511 is approximately 120 degrees corresponding to the lens of the mono camera. In addition, the cameras 502 are rotated outward from the centerline 520 within the horizontal x-z plane. In one example, the outwards rotation (e.g., the yaw angle 522) is approximately 40-45 degrees. By disposing the mono cameras at 45 degrees a balance between the compound and overlapping HFOV is optimized for the ARH experience. The arrangement maximizes the compound FOV, while providing a reasonable overlapping FOV. In this example, the overlapping FOV is approximately 70 degrees. As a result, sufficient data is provided for the AR applications and computer vision processes by providing robust environmental sensing and mapping in addition to supplemental data for 3D volumetric sensing and hands sensing. Moreover, in this example, as only two mono cameras are provided, the amount of weight, power consumption, and heat generated are reduced. In addition, the overall cost of the sensor array may be reduced and user comfort is improved by obviating the need for additional cameras or sensors. It will be appreciated that the depiction in FIG. 5 with regard to one plane is made to describe the relation and orientation of the cameras with regard to each other in this plane. However, one skilled in the art will appreciate that the mono cameras detect and capture data within a volume of a cone extending from the vertex or a pex located at the lens/image sensor of the camera. The volume of the cone of detection is determined by the FOV angle of the lens of the camera (e.g., approximately 120 degrees).

Depth Camera

Figure 6:
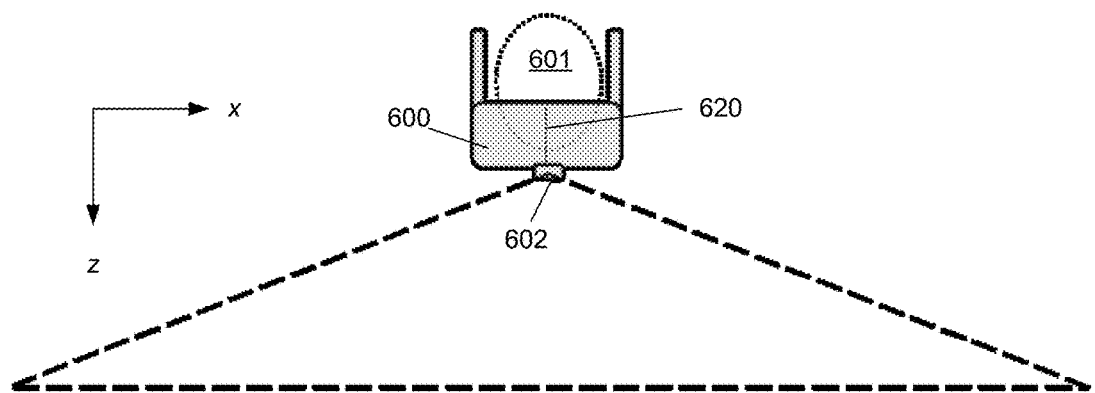
FIG. 6 shows an example of configuration of a depth camera in an augmented reality system.

FIG. 6 shows an example of the configuration of an ARH 600. As shown in FIG. 6, ARH 600 is worn by a user 601 and includes a depth sensor 602. In one implementation, the depth sensor 602 is positioned on the front face or outer surface of the ARH 600 oriented in a direction of the user's FOV. As described above, one primary function of depth sensor 602 is input for Hand Sensing. Therefore, the depth sensor 602 may be positioned on a centerline 620 of the ARH 600 roughly corresponding to the middle of the forehead of user. For example, the depth sensor 602 may be centered on the sensor array 101 so depth sensor 602 can detect the user's left and right hands with equal accuracy (e.g., without cropping one hand more than the other hand). For example, a non-centered depth camera will result to one hand not being sensed as far right or far left as the other hand.

The depth camera points generally in the same direction as the user's FOV. In one example, the depth camera is tilted slightly downward from the x-z plane of the HFOV, for example corresponding to the space where a user is most likely to use their hands while engaging with virtual objects in their FOV. In one example, this angle may be approximately 65 degrees in relation to the HFOV plane (or 25 degrees forward from a vertical plane roughly corresponding to the vertical plane formed by the user's forehead).

RGB Camera

Figure 7:
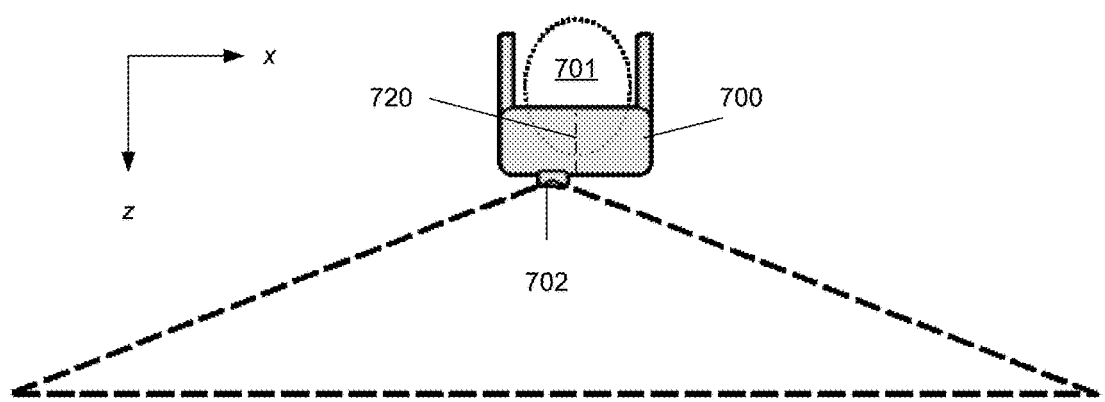
FIG. 7 shows an example of configuration of an RGB camera in an augmented reality system.

FIG. 7 shows an example of the configuration ARH 700. As shown in FIG. 7, ARH 700 is worn by a user 701 and includes with a color camera 702. The color camera 702 is positioned on the front face or outer surface of the ARH in a direction to capture or sense a FOV of the user (e.g., what the user is looking at). In the examples provided above, the output from the color camera 702 is primarily used for POV video. Therefore, in order to better convey the experience of the user, the color camera 702 is positioned close to a centerline 720 of the ARH roughly corresponding to the middle of the forehead of user. Because of the importance of the depth sensor to be centered in the sensor array, the color camera 702 may be placed next to the depth sensor (e.g., slightly to one or the other side of the depth sensor or above or below the depth sensor).

The color camera 702 points generally in the same direction as the user's FOV to mimic the user's FOV. In one example, the color camera 702 is tilted slightly downward from the x-z plane of the HFOV, for example corresponding to the space where a user is most likely to use their hands while engaging with virtual objects in their FOV. In one example, this angle may be approximately 65 degrees in relation to the HFOV plane (or 25 degrees forward from a vertical plane roughly corresponding to the vertical plane formed by the user's forehead).

FIGS. 8A, 8B, 8C, 8D, and 8E show a top view, a font view, a side cutaway view of the front view, a back perspective view, and a bottom view of one example of an implementation of the a mechanical holder assembly 800 holding and positioning two mono cameras 801, a depth camera 810, and a RGB camera 820 for a sensor array.

The mechanical holding assembly 800 of the sensor array has a first generally planar portion 802 having two faces, for example, an exterior face 803 and an interior face 805, and four sides including two ends 807 and 809. The length of the first portion 802 generally correlates to the width of a user's forehead (e.g., the region between the temples of a user). The lens 825, the lens holder 827, and the depth sensor 830 of depth camera 810 are disposed through a hole in the center 831 of the first portion between the ends to capture data generally corresponding to a user FOV. The light emitting device 833 of the depth camera 810 is disposed through a hole to one side of the lens 825 to emit light in the direction a user is facing. The lens 845, holder 847, and color image sensor 850 of the RGB camera 820 is disposed through a hole in the first potion 802 to one side of the lens 825 generally oriented and facing the FOV of a user.

The holding assembly 800 may further include two generally planer wing portions 811 and 813. The wings 811 and 813 generally correspond to the temple regions of the user. The lens 865, the lens holder 867, and the image sensor 870 of a mono camera 801 are disposed through holes in each wing 811 and 813. The wings 811 and 813 extend from the ends 807 and 809 of the first portion 802, respectively. The intersection of planes of the wings 811 and 813 and the first portion 802 form a compound, obtuse angle (not shown). An obtuse angle 814 is formed by the bottom edge of the interior faces 815, 816 of the wing portions 811 and 813 and the interior face 805 of the first portion 802. For example, the angle 814 is formed by the intersection of the lines parallel to each edge or formed by the lines of a horizontal plane bisecting the faces. The angle 814 may be approximately between 120-150 degrees. In one implementation shown in FIGS. 8A-G, the angle 814 is approximately 135 degrees (e.g., providing the 45 degree yaw angle 818 for the mono camera 801). The selection of the angles 814, 818 positions and orients the mono cameras 801 so as to provide the balance between compound and overlapping FOVs described above, for example, for FIGS. 4B and 4C and the configuration shown in FIG. 5.

The mechanical holder assembly 800 also includes a number of plates 846 and fasteners 847 to hold and/or secure the sensors, including the two mono cameras 801, a depth sensor 810, and an RGB camera 820, and an IMU 822 to the first portion 802 and wing portions 811 and 813. In addition, the sensors have various connectors/interfaces 849 provided on the interior portion to connect to the interfaces and/or components of the sensor array, such as the ISP 143, to provide data collected and receive control signals.

Figure 8A:
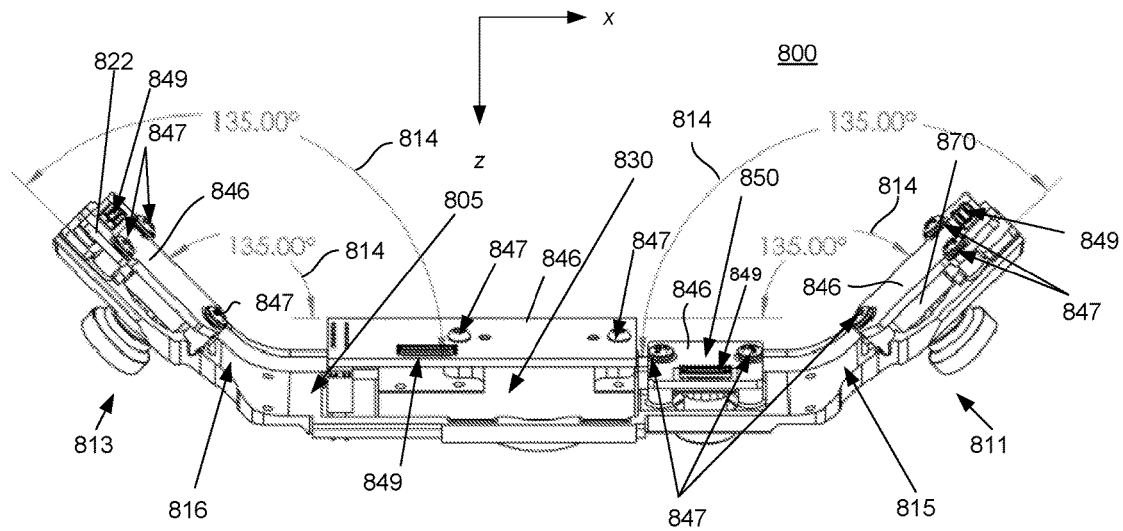
Figure 8B:
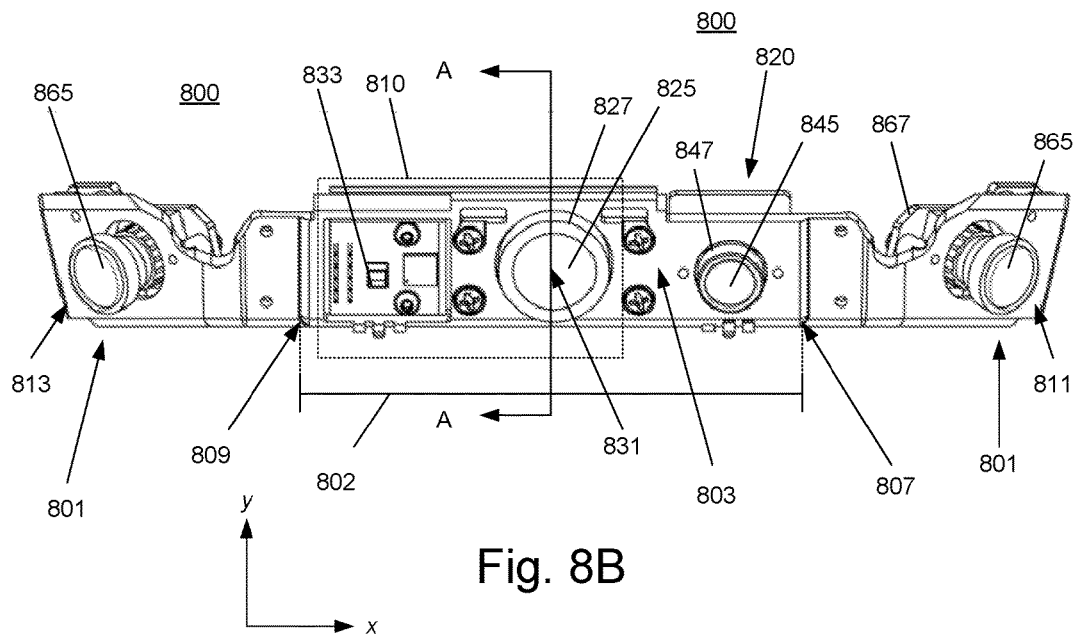

FIG. 8C shows some relative angles of the mono camera's 801. As shown in FIG. 8C, a line 875 parallel to the z-axis and a line 876 parallel to the front or back surface 815 of a wing portion (e.g., 811 or 813) form an angle 877 with horizontal FOV in the x-z plane. In some, implementations, the angle 877 is between 60-70 roughly corresponding to an area of focus of the user wearing the array. In one implementation shown in FIGS. 8A-G, the angle 877 is 65 degrees. Similarly, the angle 878 formed between a line 879 parallel to the y-axis and the front or back surface 815 of a wing portion (e.g., 811 or 813) express a downward tilt relative to, example, the user's forehead. In one example, the angle 878 is 25 degrees. The angles 877 and 878 also may apply to the orientation of the depth camera and color camera relative to the horizontal plane (e.g., 65 degrees) and the user's forehead (e.g., 25 degrees).

FIG. 8D shows some relative angles of orientation with regard to the disposition of the portions of the mechanical holder assembly 800. As shown in FIG. 8D, a line 881 parallel to the front surface 817 or a line 882 parallel to the back surface 815 of a wing portion (e.g., 811 or 813) form angles 884 and 884, respectively, with regard to a line parallel to the bottom edge 888 of the holder assembly 800, which is parallel with horizontal FOV or the x-z plane. In one example, the angles 884 and 885 are approximately 109.00 degrees.

Figure 8E:
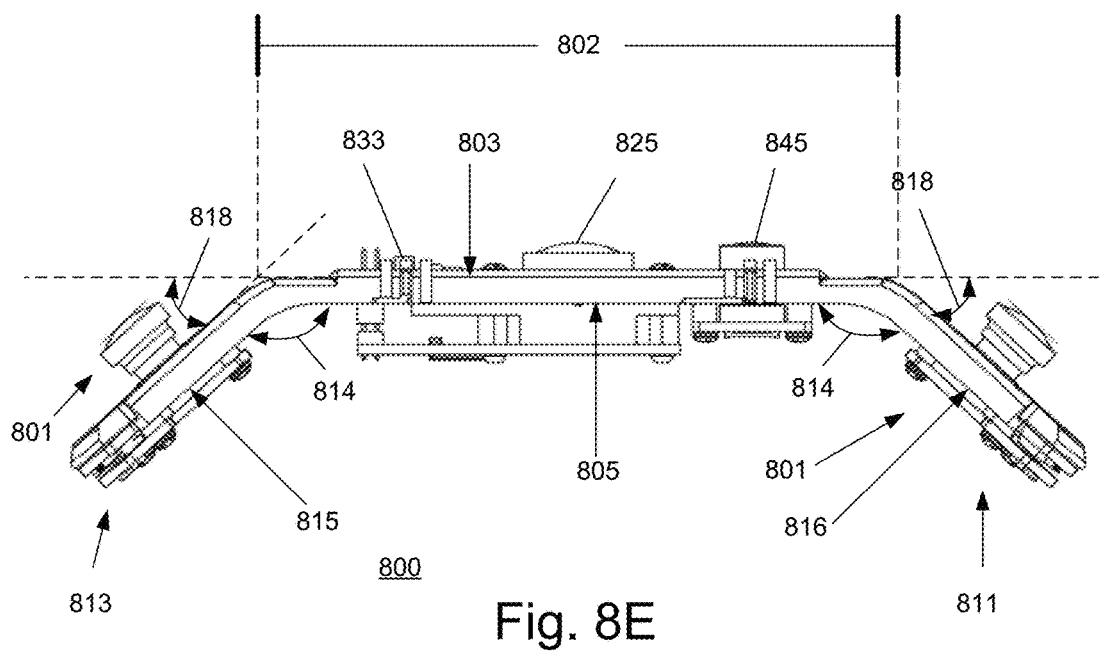

FIG. 8E shows a bottom view of the mechanical holder assembly 800. Each portion 811 and 813 generally corresponds to a temple region of the user. As shown in FIG. 8E, the wings 811 and 813 are bent from the portion 802 towards each other and/or the interior of the mechanical holder assembly 800. For example, the bend between a rear surface 815, 816 of the portions 811, 813 and the rear surface 805 of section 802 for an angle 814 of approximately 135 degrees (e.g., providing the 45 degree yaw angle 818 for the mono cameras 801). This angle allows the mono cameras to maximize the compound FOV, while providing a reasonable overlapping FOV as explained above.

Figure 8F:
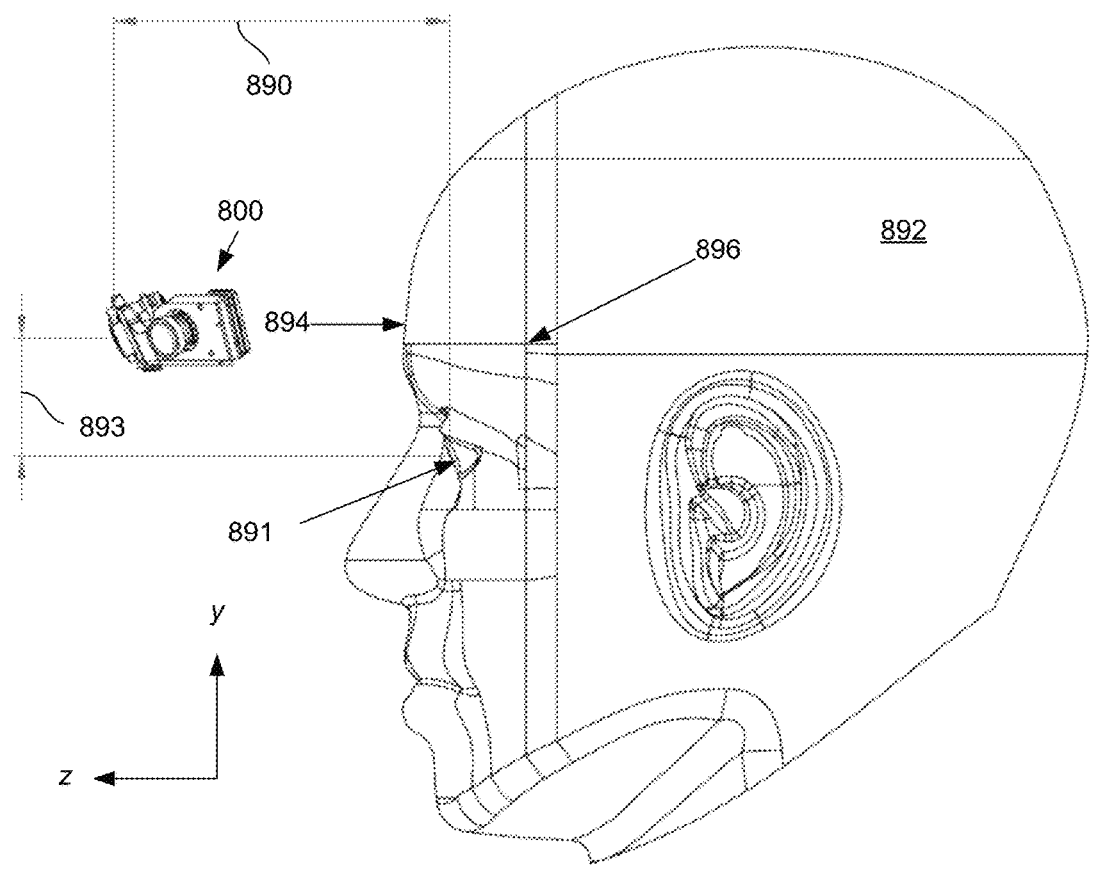
FIGS. 8F and 8G shows a side view and a front view of the mechanical holder assembly and corresponding sensors in relation to a user.
Figure 8G:
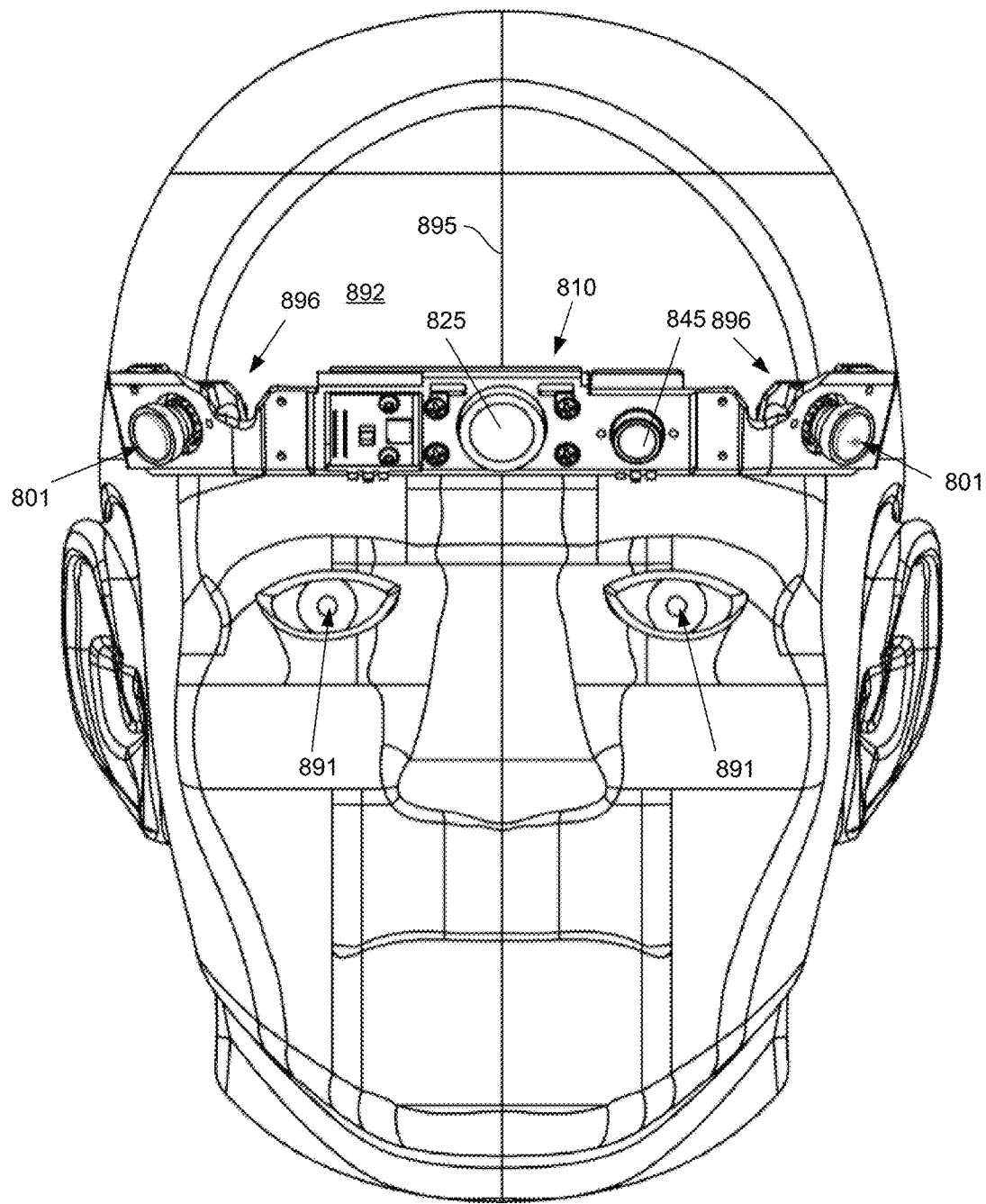

FIGS. 8F and 8G show a side view and a front view of the mechanical holder assembly 800 and corresponding sensors in general relation to the head of a user. In one general aspect, the mechanical holder is positioned above the user's eyes and in front of the user's forehead. This arrangement give the user a desired FOV and desired positioning of the sensors to collect data for use by an ARS. As shown in FIG. 8F, the front face of the array 800 may be disposed at a distance or depth 890 from the eye 891 of a user 892, and at a distance or height 893 above the eye 891 of a user 892 with relation to the z and y axes, respectively. As shown, in FIG. 8G, the assembly 800 is disposed around or in relation to a portion of the forehead or brow 894 of the user 892, and above the eyes 891 of the user 892. As shown, the lens 825 depth camera 810 is disposed on the centerline 895 in the middle of the user's forehead with the mono cameras 801 roughly placed according at the temple region 896 of the user 892. One skilled in the art will appreciate that the mechanical assembly 800 is held and/or positioned with the above-described relations to the user by a housing of an HMD (not shown in FIGS. 8F and 8G) that is worn by the head of the user 892. One example, of such a housing and HMD is shown in FIGS. 9A, 9B, and 9C and described below.

Figure 9A:
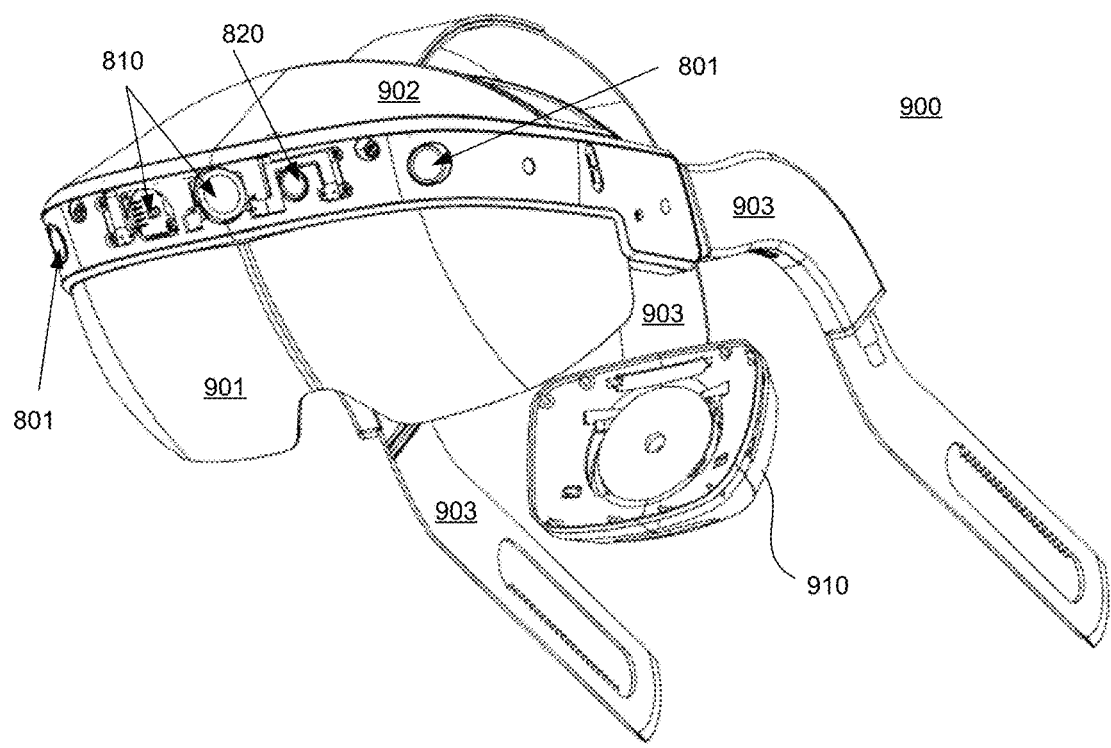
FIGS. 9A, 9B, and 9C, show examples of an augmented reality headset system including a sensory array.
Figure 9B:
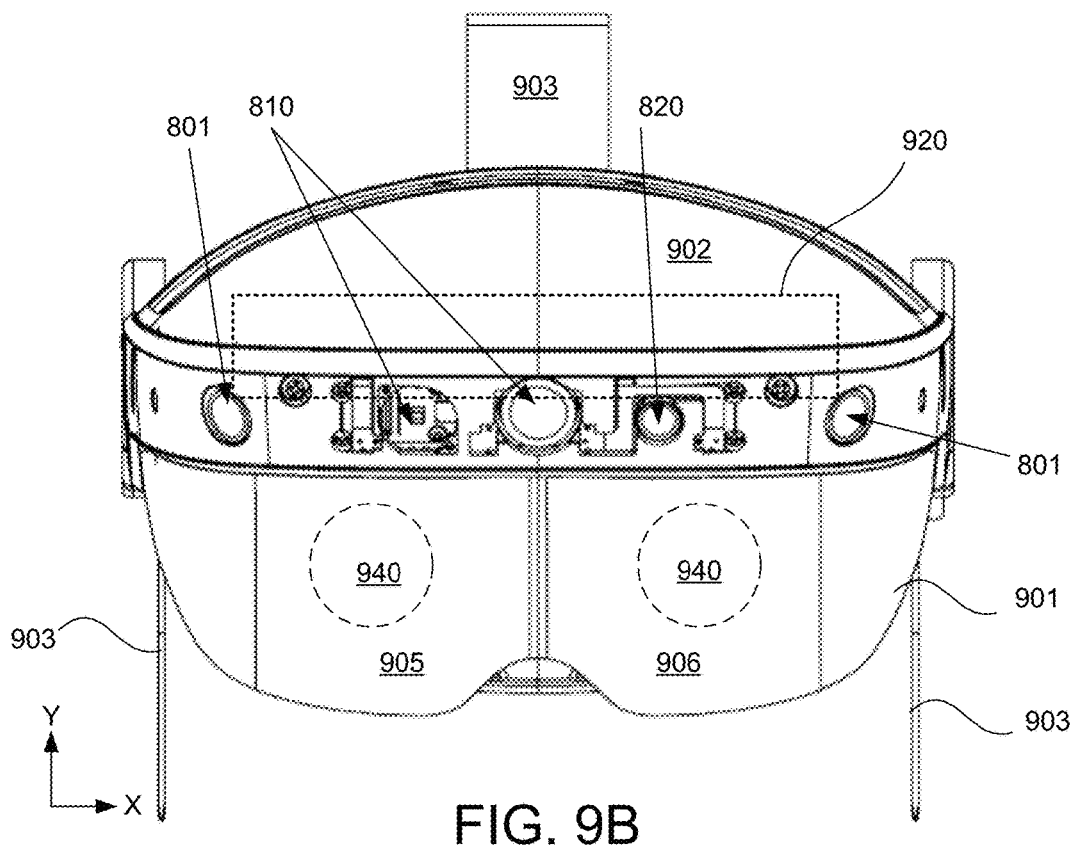
Figure 9C:
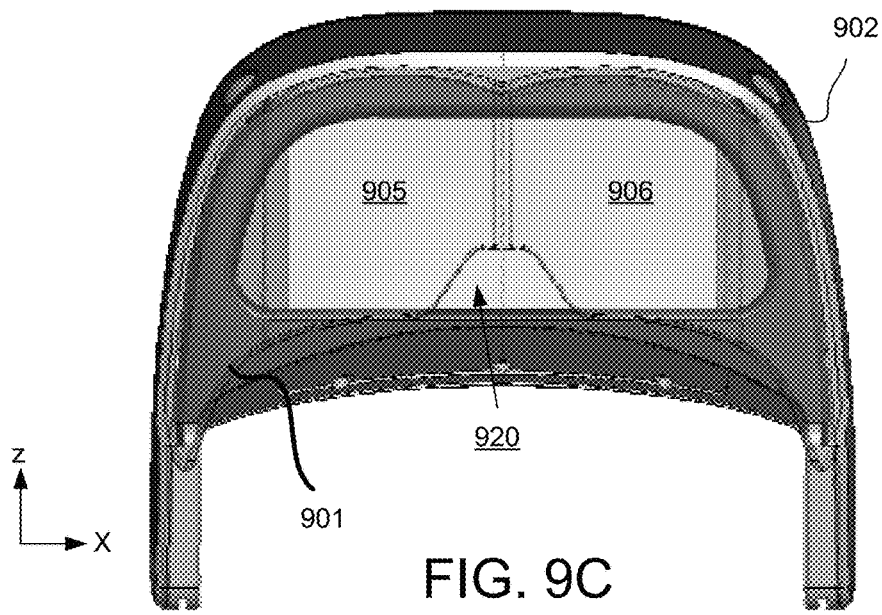

FIGS. 9A, 9B, and 9C show examples of an implementation of the client system using a ARH, which integrates the sensor array and a display or projector and optics to provide a stereoscopic optical augmented reality system.

FIGS. 9A, 9B, and 9C shows a perspective view, front view, and bottom view, respectively, of one example of an ARH 900. As shown the ARH includes a visor 901 attached to a housing 902, straps 903, and a mechanical adjuster 910 used to adjust the position and fit of the ARH to provide comfort and optimal viewing by a user of the ARH 900. The visor 901 may include one or more optical elements, such as an image combiner, that includes a shape and one or more reflective coatings that reflect an image from an illumination source 920 to the eyes of the user. In one example, the coating is partially reflective allowing light to pass through the visor to the viewer and thus create a synthetic image in the field of view of the user overlaid on the user's environment and provide an augmented reality user interface. The visor 901 can be made from a variety of materials, including, but not limited to, acrylic, polycarbonate, PMMA, plastic, glass, and/or the like and can be thermoformed, single diamond turned, injection molded, and/or the like to position the optical elements relative to an image source and eyes of the user and facilitate attachment to the housing of the ARH.

In one implementation, the visor 901 may include two optical elements, for example, image regions 905, 906 or clear apertures. In this example, the visor 901 also includes a nasal or bridge region, and two temporal regions. Each image region is aligned with the position 940 of one eye of a user (e.g., as shown in FIG. 9B) to reflect an image provided from the image source 920 to the eye of a user of the ARH. A bridge or nasal region is provided between the two image regions to connect the two regions 905 and 906. The image regions 905 and 906 mirror each other through the y-z plane that bisects the nasal rejoin. In one implementation, the temporal region extends to an outer edge of the image region wrapping around the eyes to the temple housing of the ARH to provide for peripheral vision and offer support of the optical elements such that the image regions 905 and 906 do not require support from a nose of a user wearing the ARH.

In one implementation, the housing may include a molded section to roughly conform to the forehead of a typical user and/or may be custom-fitted for a specific user or group of users. The housing may include various electrical components of the system, such as sensors, a display or projector, a processor, a power source, interfaces, a memory, and various inputs (e.g., buttons and controls) and outputs (e.g., speakers) and controls in addition to their various related connections and data communication paths.

The housing 902 includes, holds, and/or positions the sensor array including one or more sensors, such as, the sensors of a sensor array that detect and collect data about the environment of the user. As shown, the sensor array includes a partially revealed mechanical holder assembly 800, two mono cameras 801, a depth camera 810, a RGB camera 820.

The housing also positions the visor 901 relative to the image source 920 and the user's eyes. In one example, the image illumination 920 may be implemented using one or more displays or projectors. For example, the image source may be a single display. If an optical element 905, 906 of the visor is provided for each eye of a user, the display may be partitioned into at least two halves. For example, each half may display an image intended for a separate eye. In another example, two displays may be provided. In this example, each display is paired with a corresponding optical element or image area, where each pair provides an image to an eye of the user. Examples of displays include a liquid crystal display (LCD), a Light Emitting Diode (LED) display, a flexible organic LED (OLED) display, and a Liquid Crystal on Silicon (LCoS or LCOS). In one example, a single 4.5- to 5.2-inch diagonal Liquid Crystal Display (LCD) may be used. In another example, dual 2.8-3.4-inch diagonal LCDs, one for each eye, may be used.

In one implementation, the display may be part of a mobile phone or other mobile device that is separate from, but placed within and/or affixed to, the ARH and/or ARH housing and is subsequently detachable or removable therefrom. For example, a user-accessible opening may be provided to accept and position a mobile phone or other mobile device with a display to provide an image source for the ARH. In this example, a hatch or a slot is configured to accept the mobile phone or other mobile device and provide access to a guide, a rail, one or more walls, or a shelf to position the display of the mobile device or mobile phone outside the field of view and at the geometries according to the descriptions and examples provided herein. In yet another example, an opening may provide one or more fasteners, such as a clip or deformable member that accept and detachably lock and position the display of the mobile device or mobile phone outside the field of view and at the geometries allowing reflection to the user's eyes.

As described above, the techniques described herein for a wearable AR or VR system can be implemented using digital electronic circuitry, or in computer hardware, firmware, software, or in combinations of them in conjunction with various combiner imager optics. The techniques can be implemented as a computer program product, i.e., a computer program tangibly embodied in a non-transitory information carrier, for example, in a machine-readable storage device, in machine-readable storage medium, in a computer-readable storage device or, in computer-readable storage medium for execution by, or to control the operation of, data processing apparatus or processing device, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in the specific computing environment. A computer program can be deployed to be executed by one component or multiple components of the vision system.

The exemplary processes and others can be performed by one or more programmable processing devices or processors executing one or more computer programs to perform the functions of the techniques described above by operating on input digital data and generating a corresponding output. Method steps and techniques also can be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. The processing devices described herein may include one or more processors and/or cores. Generally, a processing device will also include, or be operatively coupled to receive data from or transfer data to, or both, one or more mass storage devices for storing data, such as, magnetic, magneto-optical disks, or optical disks. Non-transitory information carriers suitable for embodying computer program instructions and data include all forms of non-volatile memory, including by way of example semiconductor memory devices, such as, EPROM, EEPROM, and flash memory or solid-state memory devices; magnetic disks, such as, internal hard disks or removable disks; magneto-optical disks; and CD-ROM and DVD-ROM disks. The processor and the memory can be supplemented by, or incorporated in special purpose logic circuitry.

The ARH may include various other components including various optical devices and frames or other structure for positioning or mounting the display or projection system on a user allowing a user to wear the vision system while providing a comfortable viewing experience for a user. The ARH may include one or more additional components, such as, for example, one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, and one or more communications interfaces configured to send and receive data over various communications paths. In addition, one or more internal communication links or busses may be provided in order to connect the various components and allow reception, transmission, manipulation, and storage of data and programs.

The various embodiments and implementations described above provide a sensor array that is optimized to acquire data of a sufficient quantity and accuracy for one or more augmented reality applications and/or computer vision processes to maximize the FOV of a user and seamlessly render virtual elements within the user FOV. In addition, the configurations and arrangements also optimize one or more of weight, power consumption, processing power, heat generation, and user comfort, among others. Moreover, an optimized sensor array is provided that minimizes overall cost of the system without degradation of overall performance of the visual images experienced by the user of the system.

The preceding detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described above are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims, which expressly states otherwise. It is understood that "at least one" is equivalent to "a."

The aspects (examples, alterations, modifications, options, variations, embodiments, and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate embodiments may not have been presented for a specific portion of the invention or that further alternate embodiments that are not described may be available for a portion is not to be considered a disclaimer of those alternate embodiments. It will be appreciated that many of those embodiments not described incorporate the same principles of the invention and others that are equivalent. Thus, it is to be understood that other embodiments may be utilized and functional, logical, organizational, structural and/or topological modifications may be made without departing from the scope and/or spirit of the disclosure.

In order to address various issues and advance the art, the entirety of this application (including the Cover Page, Title, Headings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. A sensor array optimized for an augmented or virtual reality system, the array comprising:
   a plurality of sensors including:
      two cameras;
      and
   a mechanical assembly positioning the plurality of sensors in a configuration optimized to sense information for one or more computer vision applications of the augmented or virtual reality system, wherein the mechanical assembly includes:
      a first generally planar portion including two opposite ends; and
      two wing portions, each wing portion extending from one of the ends of the first portion and formed of a generally planar portion angled from the ends of the first planar portion, each wing portion positioning one of the two cameras to sense features in wide compound field of view and stereoscopically sense features in an overlapping field of view,
   wherein the angle formed between a plane of the first portion and a plane of each wing portion is a compound angle.

2. The sensor array of claim 1, wherein the plurality of sensors includes a depth sensor and a color camera, and the two cameras are monochrome cameras.

3. The sensor array of claim 1 wherein the compound field of view is between 200-260 degrees as measured in a horizontal plane.

4. The sensor array of claim 1 wherein the overlapping field of view is between 60-80 degrees as measured in a horizontal plane.

5. The sensor array of claim 1 wherein the angle formed between the first portion and each wing portion in a horizontal plane is between 120-150 degrees.

6. The sensor array of claim 1, wherein the angle formed between the first portion and each wing portion in a horizontal plane is substantially 135 degrees.

7. The sensor array of claim 2 wherein the depth sensor and the color camera are positioned by the first potion.

8. The sensor array of claim 7, wherein a lens of the depth sensor is centered between the two ends of the first portion and a lens of the color camera is positioned generally adjacent to the depth sensor.

9. A sensor array optimized for an augmented or virtual reality system, the array comprising:
   a plurality of sensors including:
      two cameras; and
   a mechanical assembly positioning the plurality of sensors in a configuration optimized to sense information for one or more computer vision applications of the augmented or virtual reality system, the mechanical assembly including:
      a first generally planar portion including two opposite ends; and
      two wing portions, each wing portion extending from one of the ends of the first portion and formed of a generally planar portion angled from the ends of the first planar portion, each wing portion positioning one of the two cameras,
   wherein an angle formed between each wing portion and the first portion in a horizontal plane bisecting the first portion and the wing portion is approximately 120-150 degrees an angle formed by the intersection of the generally planar portion of each wing portion and the horizontal plane is approximately 60-70 degrees.

10. The sensor array of claim 1 further comprising an inertial measurement unit.

11. The sensor array of claim 1 further comprising a thermal sensor.

12. The sensor array of claim 1 further comprising one or more processing devices, the one or more processing devices configured to execute instructions to acquire sensor data from the plurality sensors and aggregate the sensor data for transmission to a host processing system implementing the one or more computer vision applications of the augmented or virtual reality system.

13. An augmented reality or virtual reality head mounted display (HMD) system comprising:
   a display,
   an optical element; and
   a sensor array, the sensor array including:
      a plurality of sensors including:
         two cameras;
         and
      a mechanical assembly positioning the plurality of sensors in a configuration optimized to sense information for one or more computer vision applications of an augmented reality processing system, the mechanical assembly including:
         a first generally planar portion including two opposite ends and
         two wing portions, each wing portion extending from one of the ends of the first portion and formed of a generally planar portion angled from the ends of the first planar portion, each wing portion positioning one of the two cameras to sense features in wide compound field of view and stereoscopically sense features in an overlapping field of view; and
   a housing adapted to be worn on a head of a user of the HMD including a plurality of openings, wherein the optical element is positioned by the housing relative to the display to reflect or project light emitted from the display to the eyes of the user, and the openings of the housing align with the plurality of sensors arranged by the mechanical assembly within the housing.

14. The HMD of claim 13, wherein the angle formed at the junction of the first portion and each wing portion is a compound angle where any plane, intersecting a plane of the first portion and a plane of either wing portion, that is orthogonal to the plane of the first portion is non-orthogonal to the plane of either wing portion.

15. The headset HMD of claim 13 wherein an angle formed between each wing portion and the first portion in a horizontal plane bisecting the first portion and each wing portion is approximately 120-150 degrees and an angle formed at the intersection of the generally planar portion of each wing portion and the horizontal plane is approximately 60-70 degrees.

16. The HMD of claim 13 further comprising an inertial measurement unit.

17. The HMD of claim 13 further comprising a thermal sensor.

18. The HMD of claim 13 further comprising one or more processing devices, the one or more processing devices configured to execute instructions to acquire sensor data from the plurality sensors and aggregate the sensor data for transmission to a host processing system implementing one or more computer vision applications of the augmented or virtual reality system.

19. The HMD of claim 13, wherein the compound angle is described by an angle in a horizontal plane between the first portion and each wing portion and an angle of tilt of each generally planar portion from a vertical axis orthogonal to the horizontal plane.

20. The HMD of claim 13, wherein the plurality of sensors further includes a depth sensor and a color sensor and the two cameras are monochrome cameras.

21. The sensor array of claim 1, wherein the compound angle is formed between a plane of the first portion and a plane of each wing portion where any plane, intersecting the plane of the first portion and the plane of either wing portion, that is orthogonal to the plane of the first portion is non-orthogonal to the plane of either wing portion.

22. The sensor array of claim 1, the compound angle is described by an angle in a horizontal plane between the first portion and each wing portion and an angle of tilt of each generally planar portion from a vertical axis orthogonal to the horizontal plane.

23. The sensor array of claim 9, wherein the plurality of sensors further includes a depth sensor and a color sensor and the two cameras are monochrome cameras.

* * * * *